US012754587B2

(12) United States Patent
Files et al.

(10) Patent No.: US 12,754,587 B2
(45) Date of Patent: Oct. 6, 2026

(54) MODULAR PERIPHERAL DISPLAY ASSEMBLY SUSTAINABLE POWER BOARD ARCHITECTURE

(71) Applicant: Dell Products L.P., Round Rock, TX (US)

(72) Inventors: Jace W. Files, Round Rock, TX (US); John Trevor Morrison, Round Rock, TX (US); Chiu-Jung Tsen, Zhubei City (TW)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/788,808

(22) Filed: Jul. 30, 2024

(65) Prior Publication Data

US 2026/0037032 A1 Feb. 5, 2026

(51) Int. Cl.
*G06F 1/16* (2006.01)
*G06F 1/04* (2006.01)

(52) U.S. Cl.
CPC .............. *G06F 1/1635* (2013.01); *G06F 1/04* (2013.01); *G06F 1/1637* (2013.01); *G06F 1/1658* (2013.01); *G06F 1/169* (2013.01)

(58) Field of Classification Search
CPC ................................ G06F 1/1635; G06F 1/16
See application file for complete search history.

(56) References Cited

U.S. PATENT DOCUMENTS 4,814,759 A 3/1989 Gombrich et al.
5,799,196 A 8/1998 Flannery
6,558,008 B1 5/2003 Salerno et al.
7,738,245 B1 6/2010 Stifal
8,576,551 B2 11/2013 Oh et al.
9,746,128 B2 8/2017 Huang
9,958,108 B2 5/2018 Bowman et al.
D837,223 S 1/2019 Wu et al.
10,524,369 B2 12/2019 Chiu et al.
(Continued)

OTHER PUBLICATIONS

Dell, "Monitor Arm," downloaded from dell-singlearm-monitor_setup guide_en-us.pdf on Jul. 29, 2024, 2 pages.
(Continued)

*Primary Examiner* — Jerry Wu
(74) *Attorney, Agent, or Firm* — Zagorin Cave LLP; Robert W. Holland

(57) ABSTRACT

An information handling system peripheral display presents visual images with a display panel. A timing controller board has an edge connector that interfaces with a scalar board edge connector when the scalar board couples with slots at posts of the back side. The scalar board couples display cable ports to accept display information from an information handling system and extends the display cable ports out of openings of the midplane. The scalar board communicates visual information to the adjacent timing controller board through the edge connector without the use of a cable. A power board couples with posts and slots adjacent the scalar board to engage a power connector with power pins into a socket of the power board. Power communicates from the power board through the scalar board to the timing controller board and then to a backlight through a pogo pin and contact pad interface.

15 Claims, 35 Drawing Sheets

(56) References Cited

U.S. PATENT DOCUMENTS

| | | | |
|---|---|---|---|
| 11,378,225 B2 | 7/2022 | Laurent et al. | |
| 11,490,139 B1 | 11/2022 | Lin | |
| 11,526,141 B2 | 12/2022 | Matlin | |
| 11,589,147 B1 | 2/2023 | Rao et al. | |
| 11,755,064 B2 | 9/2023 | Durant | |
| 11,822,382 B2 | 11/2023 | Zhang et al. | |
| 12,210,375 B2 | 1/2025 | Durant | |
| 2005/0236533 A1* | 10/2005 | McRight | F16M 11/041 248/161 |
| 2009/0122033 A1 | 5/2009 | Park | |
| 2009/0195793 A1 | 8/2009 | Silverbrook | |
| 2013/0088525 A1 | 4/2013 | Qiu | |
| 2014/0376757 A1 | 12/2014 | Engle | |
| 2015/0160504 A1 | 6/2015 | Woo et al. | |
| 2016/0295713 A1* | 10/2016 | Hwang | G06F 1/1601 |
| 2018/0247574 A1 | 8/2018 | Hall | |
| 2019/0052121 A1 | 2/2019 | Lu | |
| 2023/0152844 A1 | 5/2023 | Oh | |
| 2024/0028071 A1 | 1/2024 | Ooi et al. | |
| 2024/0143044 A1 | 5/2024 | Hong et al. | |
| 2024/0427401 A1 | 12/2024 | Hamlin | |
| 2025/0054451 A1 | 2/2025 | Chung | |

OTHER PUBLICATIONS

Dell, "Dell Dual Monitor Stand MDS19," downloaded from manual7005474-dell-dual-monitor-stand-mds19.pdf on Jul. 29, 2024, 2 pages.

Dell, "Dell™ MKS14," downloaded from dell-mks14_setup guide_en-us.pdf on Jul. 29, 2024, pp. 1-22.

Dell, "Dell™ E-Flat Panel Stand User's Guide," downloaded from e-flp_user's guide_en-us.pdf (dell.com) on Jul. 29, 2024, 22 pages.

Dell, "Dell S2721D/S2721DS Monitor User's Guide," downloaded from dell-s2721d-monitor_user's-guide_en-us.pdf on Jul. 29, 2024, pp. 1-69.

Dell, "User's Guide Dell Monitor Stand with USB 3.0 Dock MKS14," downloaded from dell-mks14_user's guide_en-us.pdf on Jul. 29, 2024, 23 pages.

* cited by examiner

MODULAR PERIPHERAL DISPLAY ASSEMBLY SUSTAINABLE POWER BOARD ARCHITECTURE

BACKGROUND OF THE INVENTION

Field of the Invention

The present invention relates in general to the field of information handling system peripheral displays, and more particularly to an information handling system modular peripheral display assembly sustainable power board architecture.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information. Stationary information handling systems, such as desktops and towers, operate the processing component in a stationary housing that interacts with an external power source and external peripheral devices, such as keyboard, mouse and display. Portable information handling systems have a portable housing that integrates a display and a power source to support mobile operations. Portable information handling systems allow end users to carry a system between meetings, during travel, and between home and office locations so that an end user has access to processing capabilities while mobile. Portable information handling systems typically also interact with end users through external peripheral devices, which tend to offer larger and more comfortable interfaces for the end user than integrated devices. A typical desktop environment will include a peripheral keyboard and peripheral mouse to accept end user inputs and a peripheral display to present information as visual images.

Peripheral displays typically include a display panel with an array of pixels that generate a visual image from pixel values communicated by an information handling system. The array of pixels may include liquid crystal display (LCD) pixels that that filter light from a white backlight source with red, green and blue liquid crystal material or organic light emitting diode (OLED) pixels that generate red, green and blude light when an electric field is applied. The display panel is fed a stream of pixel values across the array by a timing controller that scans the values to the array of pixels. The timing controller receives the pixel values from a scalar that adjusts the pixel values to a scale appropriate for the array of pixels, such as different resolutions that depend upon the visual image to be presented and the dimensions of the array of pixels in the display panel. A power board receives external power and applies the power to the display panel, backlight, timing controller and scalar. The visual images are typically communicated to the scalar through a standardized cable and connector, such as an HDMI, DisplayPort or USB Type-C interface. Typically, the display panel assembles in a flat panel configuration and couples to a display stand that holds the display assembly in a viewing position. For example, the backside of the display assembly couples to a display stand with a VESA standard coupling interface.

One difficulty with peripheral displays is that different sizes and arrangements of the components tend to result in complex designs. Peripheral displays are not typically upgradeable or repairable. When a display component goes bad, the complete display assembly and stand is typically disposed of as general waste without recycling. In particular, peripheral displays tend to have complex designs held together by screws that are difficult to disassemble so that efforts to recycle display components are not typically cost effective. A lack of modularity impedes repair and upgrade operations, which tends to result in premature disposal that exacerbates environmental electronic waste management problems. In addition, the use of unsustainable materials and manufacturing processes further contributes to environmental harm. For instance, even when a peripheral display is torn down for recycling, the lowest common component modules tend to include a variety of materials that are not compatible with each other for a recycle process. Design constraints and technical considerations make modularity and ease of repair difficult to achieve, especially in the display assembly backplane and midplane that have expensive critical components of a display monitor.

SUMMARY OF THE INVENTION

Therefore, a need has arisen for a system and method which assembles peripheral displays in a modular manner that enhances repair, upgrade and recycling.

In accordance with the present invention, a system and method are provided which substantially reduce the disadvantages and problems associated with previous methods and systems for assembly of peripheral displays. A peripheral display is assembled from modular support and electronic components without screws and cables to enable automated robotic manufacture, reuse and recycling.

More specifically, an information handling system processes information with a processor and memory that is presented as visual images at a peripheral display. The peripheral display is assembled by sliding engagement of display assembly components, such as sliding a midplane having geometric structures onto a display panel back side with conforming slots to define a vertical space behind the display panel in which electronic components couple. A cover slidingly engages the midplane to couple over the electronic components and define a cavity in which the electronic components operate. The electronic components assemble in modular fashion to posts formed in the display panel back side and at adjacent positions where connectors on opposing edges of the electronic components contact to provide power and information communication without cables. EDID information is tracked on components and retrieved to scalar board that applies the EDID information to operate the electronic components in a cohesive manner. A modular input/output board enhances peripheral display functionality by including a scalar that takes over embedded scalar functions or, alternatively, by including EDID information available to the embedded scalar for use in peripheral display operations.

The present invention provides a number of important technical advantages. One example of an important technical advantage is that a peripheral display is assembled with interchangeable modules that encourage reuse and recycling. The electronic components assemble to the display panel back side with sliding adjacent coupling arrangements that eliminate the use of cables between the components. A plastic midplane and cover couple to the backside to define a cavity that accepts the electronic components and separate at end of life into like-material portions to simplify recycling. Power is supplied in a flexible manner that can include integrated power conversion, an external power adapter and power transfer through a display cable. A power adapter frame included in the display panel cavity supports the reuse of information handling system power adapters within the display. Automated EDID management ensures that component assembly correctly adapts peripheral display operations to the selected components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system presents visual images at a modular peripheral display assembled with reusable components. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
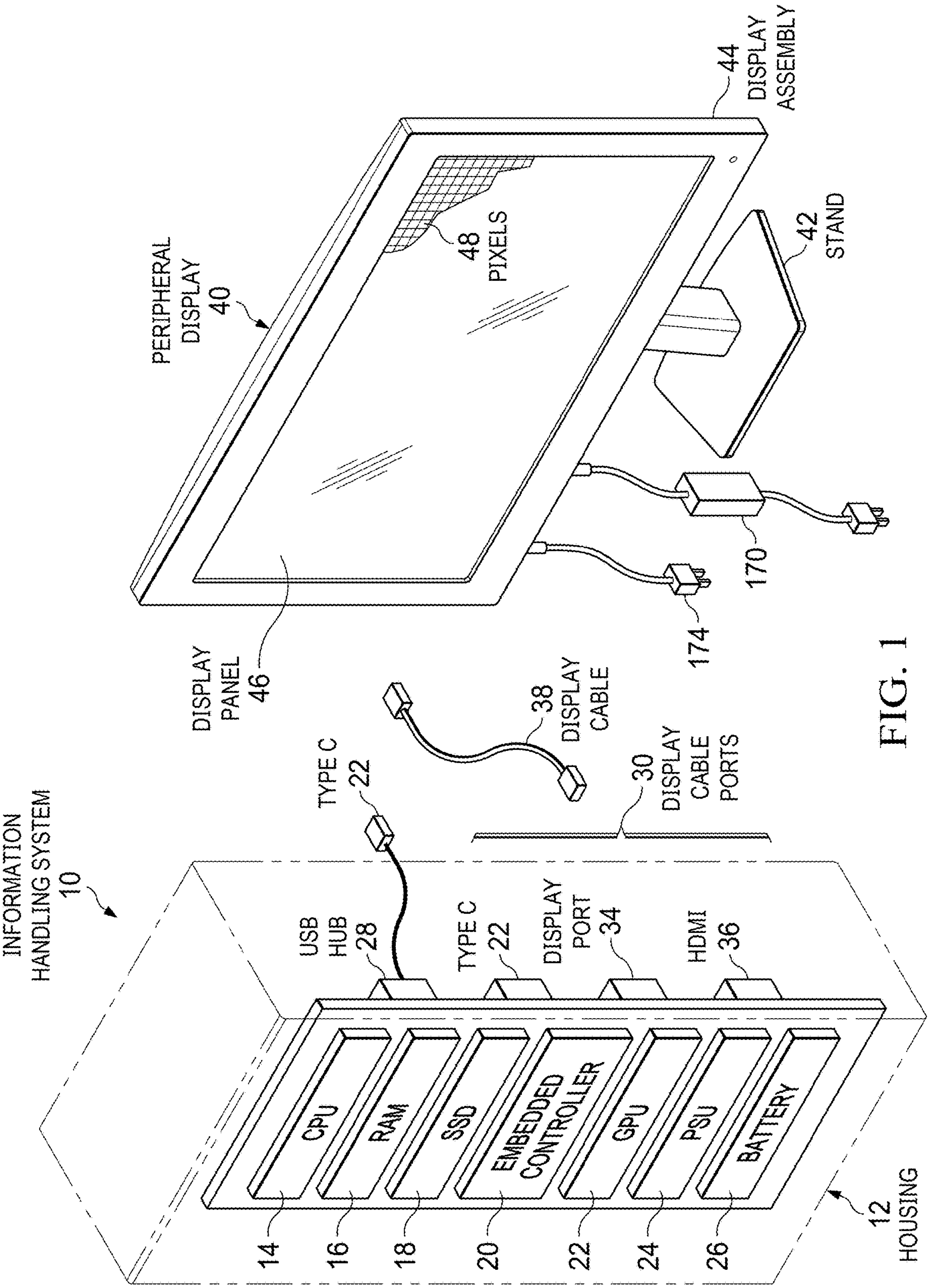
FIG. 1 depicts a block diagram of an information handling system interfaced with a modular peripheral display that presents information as visual images.

Referring now to FIG. 1, a block diagram depicts an information handling system 10 interfaced with a modular peripheral display 40 that presents information as visual images. A housing 12 contains processing components that cooperate to process information and can include stationary housings, such as for desktop or tower information handling systems, and portable housings, such as for convertible or tablet information handling systems. A central processing unit (CPU) 14 executes instructions that process information in cooperation with a random access memory (RAM) 16 that stores the instructions and information. A solid state drive (SSD) 18 provides persistent non-transitory memory that stores information when the system is powered down, such as an operating system and applications that are retrieved to RAM 16 by an embedded controller 20 when the system powers up. Embedded controller 20 manages system operating conditions, such as power and thermal operating conditions, and interactions with input/output devices, such as a keyboard and mouse to accept end user inputs. A graphics processing unit (GPU) 22 interfaces with CPU 14 to further process information into a format for presentation at a display panel, such as by defining a visual image as an array of pixel values. In the example embodiment, GPU 22 outputs the visual image information through a variety of different display cable ports, including a Type C USB port 22, a DisplayPort port 34 and an HDMI port 36. A power supply unit 24 supplies power for operation of the processing components, such as with power from an external AC power cord or a battery 26 that charges when power is available and discharges when power is not available. In example embodiment, PSU 24 and battery 26 support mobile operations for a portable information handling system. In an alternative embodiment, PSU 24 and battery 26 cooperate as an uninterruptable power supply (UPS) that keeps information handling system 10 operating when external power cuts off.

In the example embodiment, information handling system 10 presents information as visual images at a peripheral display 40 by communicating the visual information from display cable ports 30 through display cable 38 to display cable ports of peripheral display 40. A USB Hub 28 included in information handling system 10 includes a capability to communicate power between information handling system 10 and peripheral display 40, such as in accordance with the USB Type C standard. Peripheral display 40 has a display assembly 44 that is held in a viewing position by a display stand 42. Display assembly 44 has a display panel 46 at a front face that has an array of pixels 48 configured to present visual images based upon pixel values communicated from GPU 22. Peripheral display 40 is powered by one or both of an external AC power cord 174 that interfaces with an AC plug and an external AC-to-DC power adapter 170 that interfaces with a DC plug, such as a barrel connector or a USB Type C cable connector. In addition to the AC and DC plugs, peripheral display 40 may operate on power received from information handling system 10, such as through a Type C USB cable connection power transfer. Power from information handling system 10 may be in addition to power from the AC and DC plugs or as a separate power source, such as a UPS from PSU 24 and battery 26 when other power provided to peripheral display 40 is cut off.

Figure 2:
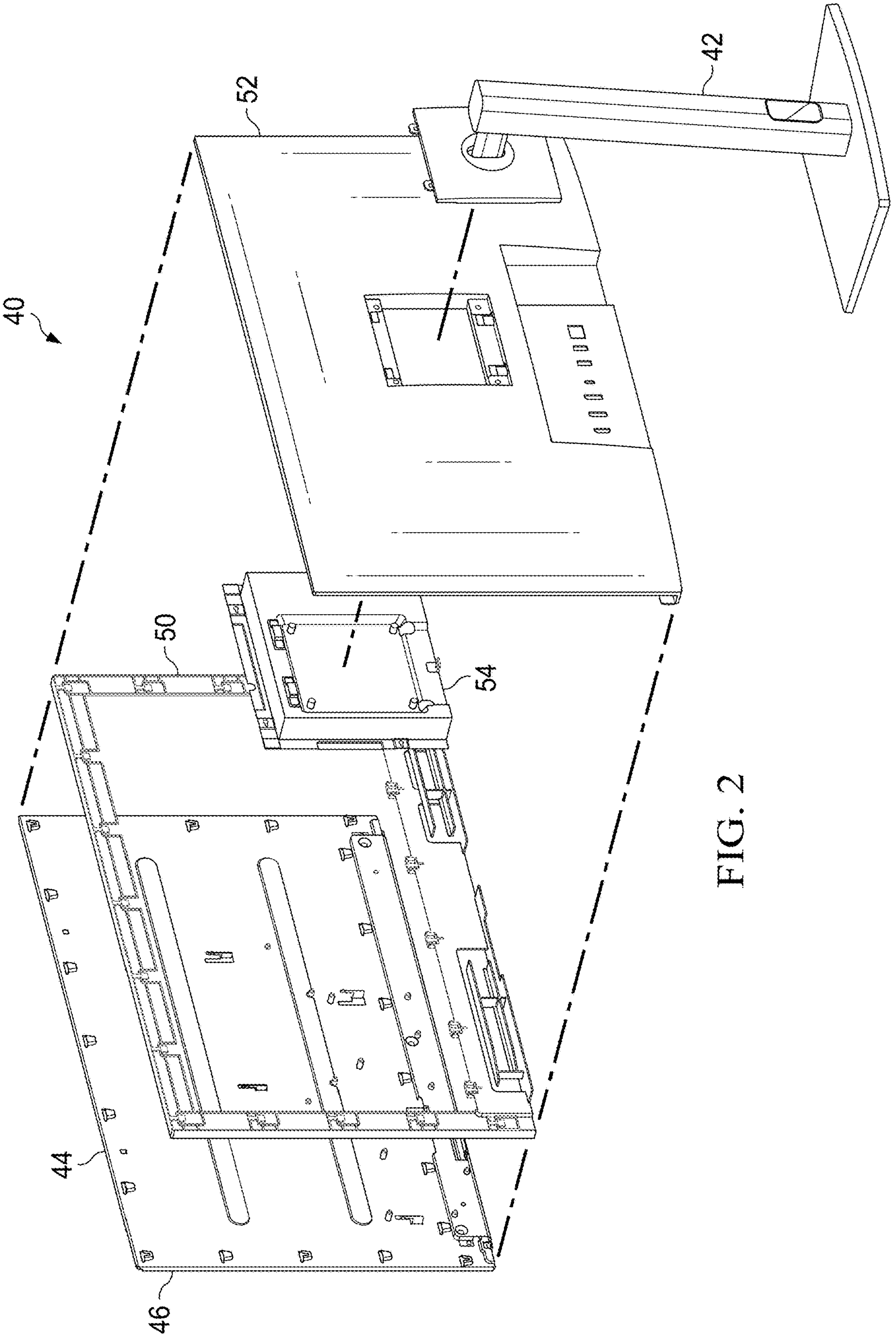
FIG. 2 depicts a side perspective exploded view of the peripheral display structural elements that assemble in a sustainable manner without screws for improved assembly and end of life reuse and recycling.

Referring now to FIG. 2, a side perspective exploded view of peripheral display 40 depicts structural elements that assemble in a sustainable manner without screws for improved assembly and end of life reuse and recycling. In the example embodiment, display assembly 44 includes a display panel 46 at a front face that presents visual images and is held at a viewing height by a stand 42 coupled to a stand support 54 that couples to a back side of display panel 46. A midplane 50 couples around a perimeter of display panel 46 between the back side of display panel 46 and a cover 52 that encloses the back side of display assembly 44. Peripheral display 40 is assembled to have the components breakdown by a material type or function. For example, midplane 50 and cover 52 are injection molded plastic that assemble and disassemble without screws to encourage recycling with an automated approach. Within the cavity defined by midplane 50 between the display panel back side and the cover, electronics assemble in a modular fashion to encourage interchangeability and with a lack of cables, as is described below in greater detail.

Figure 3:
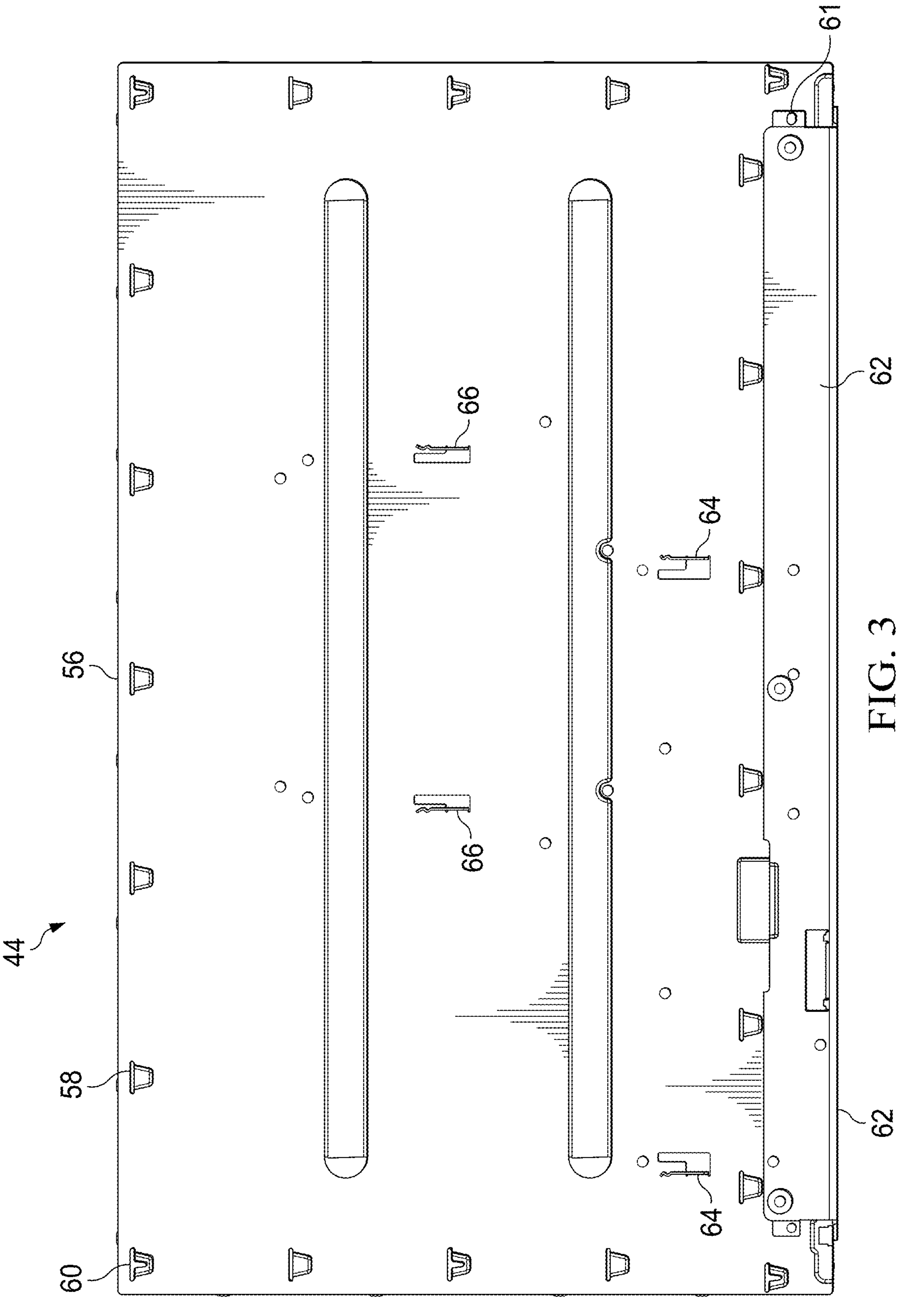
FIG. 3 depicts a rear side view of a display panel back side configured to assemble into a display assembly in an automated manner.

Referring now to FIG. 3, a rear side view depicts a display assembly 44 back side 56 configured to assemble into a display assembly in an automated manner. Slots 58 and 60 are formed in a metal plate of the back side to extend out and have an opening towards a top side of the display panel. In the example embodiment, the slots have a U shape with a taper from the opening to a base that accepts a geometric structure of a corresponding shape so that the shape readily inserts into the slot and has more tight fit as the shape is further inserted into the slot. In one embodiment, the positions of slots 58 and 60 may be spaced to ascertain the orientation of a midplane that couples to the slots. A timing controller board 62 is a PCB that supports a timing controller interfaced with pixels of the display panel 46 to scan pixel values to the pixels that define a visual image for presentation at the display panel. A variety of posts 64 and 66 are punched out of the display panel back side to extend outwards and accepts components, such as circuit boards, that couple to the display panel back side. A snap connector 61 is located at a bottom corner of the display panel back side to couple to a midplane when the midplane fully slides to a coupled position as depicted below. Snap connector 61 has a removable configuration that supports disassembly of the midplane by automated means, such as predetermined forces that overcomes the snap when applied by a robotic arm.

Figure 4:
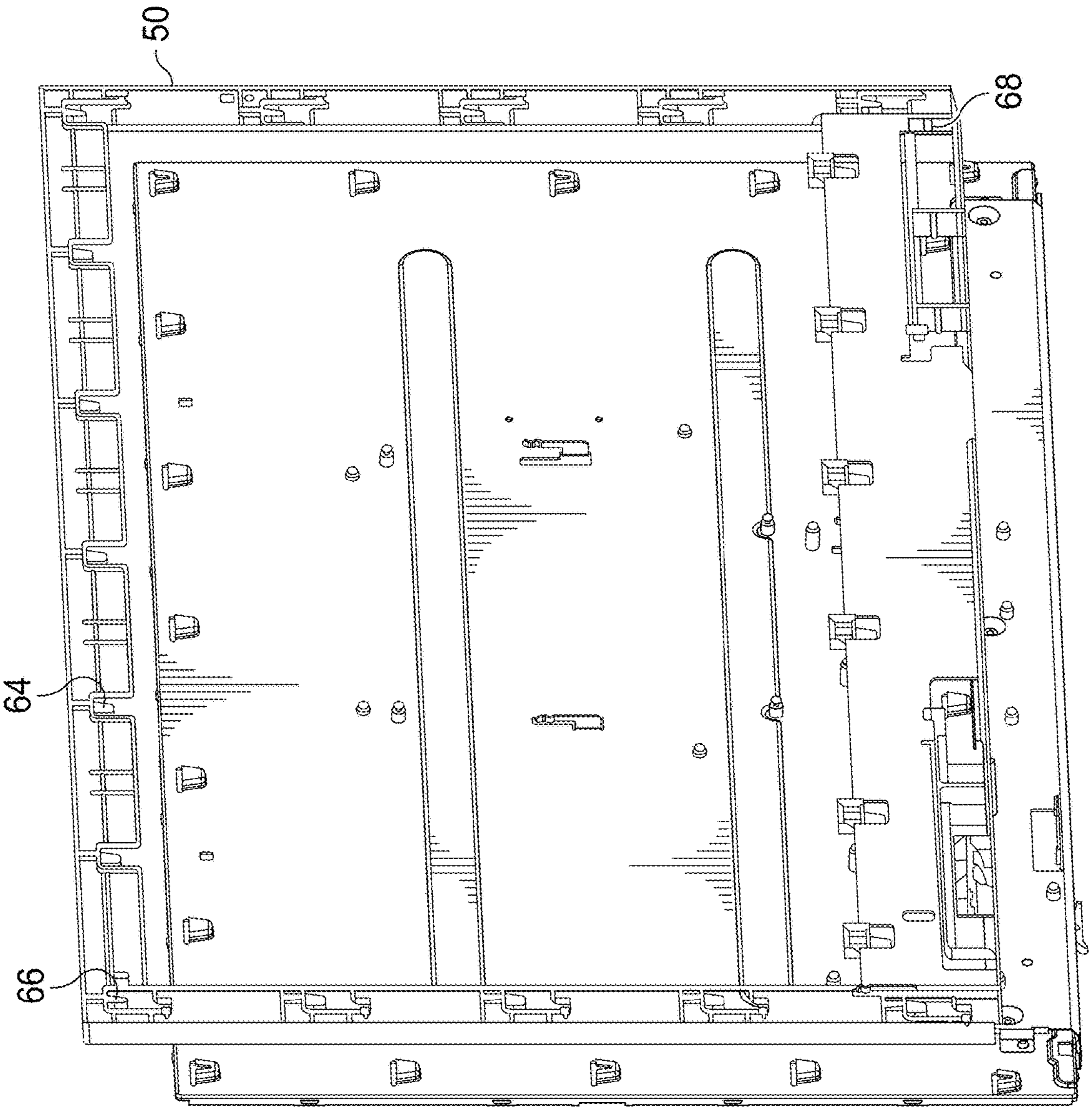
FIG. 4 depicts a rear perspective exploded view of a midplane aligned to slidingly couple in place at a back side of a display panel.

Referring now to FIG. 4, a rear perspective exploded view depicts a midplane 50 aligned to slidingly couple in place at a back side of a display panel. Midplane 50 is injection molded plastic having geometric structures 66 and 64 shaped to fit into the slots punched out of the metal of the display panel back side. A snap 68 at a bottom corner is configured to engage the snap connector of the display panel back side when midplane 50 slides completely into position. Midplane 50 provides a separation of materials between the display panel and the electronic components at the display panel back side to delineate recyclable or reusable portions of the display. The side walls at the perimeter of midplane 50 define a vertical space behind the display panel to include the electronic components and provide an assembly surface to couple on a cover. By sliding midplane 50 onto the display panel from a top side towards a bottom side, the effect of gravity is to keep a secure attachment between the midplane and display panel after deployment as the weight of the display panel works to maintain a secure attachment of the geometric structures in the slots. Although the example embodiment as explained below uses a U-shape geometric structure to obtain secure attachment and proper alignment, other types of geometric shapes may be used, such as a V shape or different types of shapes at different locations of the perimeter. In addition, midplane 50 includes tabs near each geometric structure that define a rail onto which a guide of a display panel rear cover can slide, as described in greater detail below.

Figure 5A:
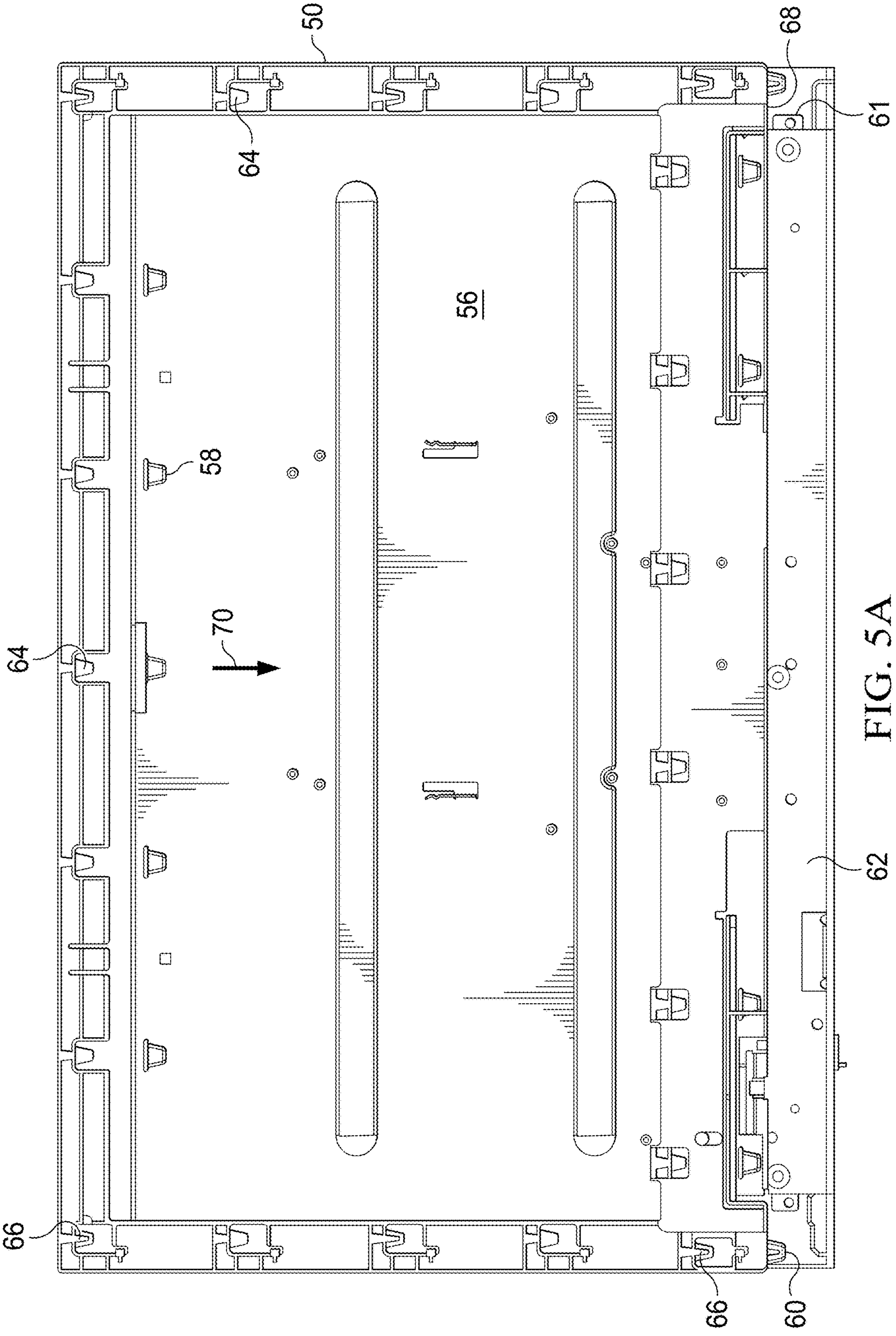
FIGS. 5A, 5B, 5C and 5D depict a rear view of a sliding engagement of the midplane and display panel rear side.
Figure 5B:
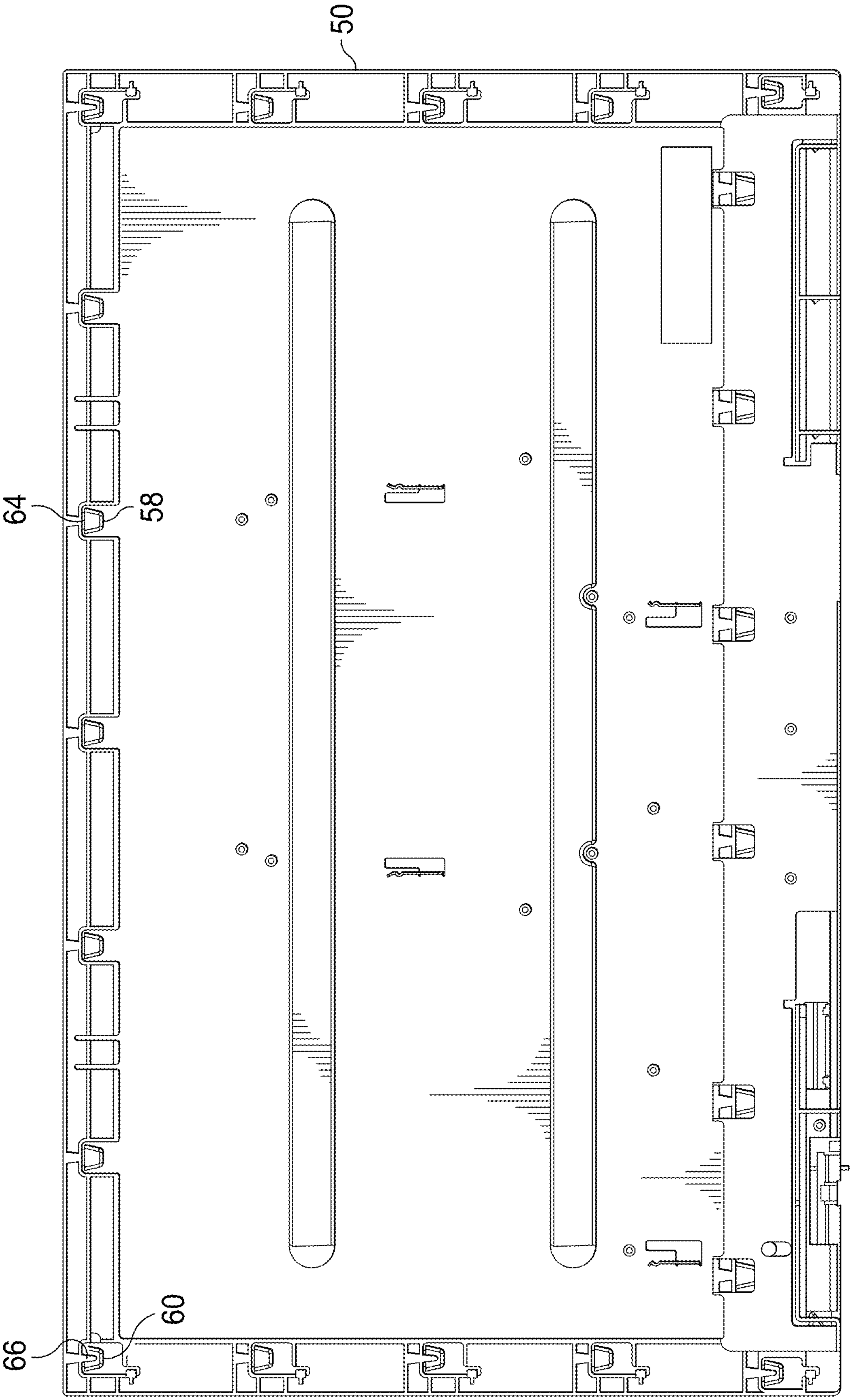
Figure 5D:
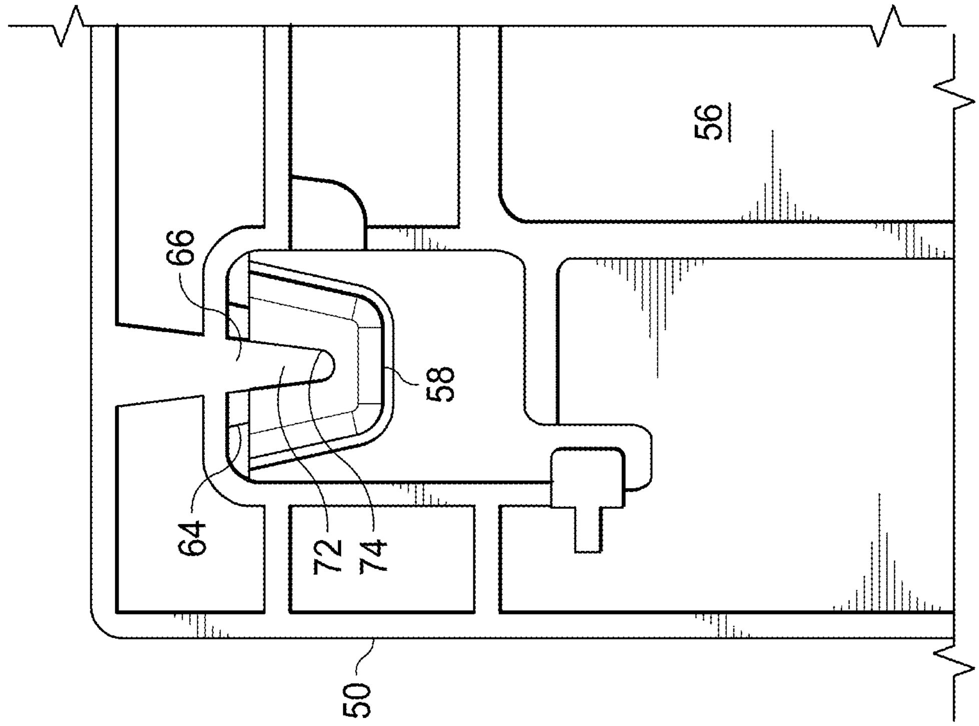
Figure 5C:
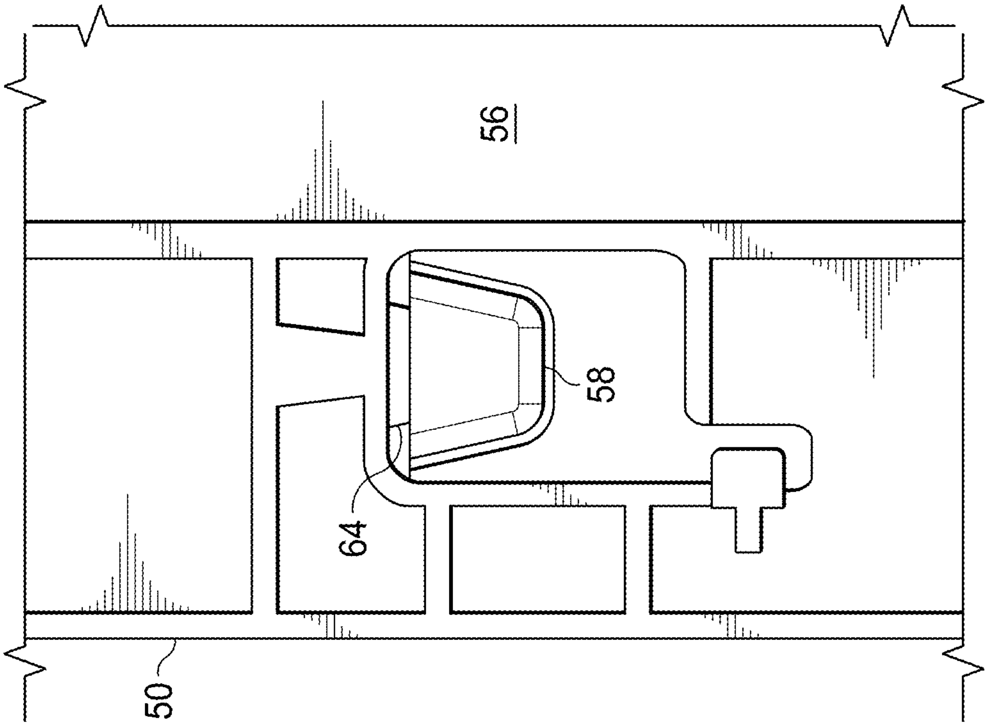

Referring now to FIGS. 5A, 5B, 5C and 5D, a rear view depicts a sliding engagement of the midplane and display panel rear side. In the example embodiment, each geometric structure 64 and 66 has an open space at a bottom side that provides space for placement of midplane 50 onto the display panel back side 56 at slots 58 and 60. Once midplane 50 is aligned to slide onto display panel back side 56, a sliding motion in the direction of arrow 70 engages the geometric structures 64 and 66 into the slots 58 and 60 so that the bottom side of midplane 50 slides over timing controller board 62 and the snap 68 engages with snap connector 61 to hold midplane 50 in place. FIG. 5C depicts a detailed view of a geometric structure 64 that inserts into a slot 58 with corresponding U shapes so that the geometric shape achieves a tight fit to the slot upon completion of the sliding insertion. In the example embodiment, to allow some deviation from alignment in the manufacture process, the geometric structure may have some room to slide within the slot while a firm coupling together is provided with a tight fit in the Z axis perpendicular to the sliding direction. In order to attain a desired alignment of midplane 50 relative to the back side 56, each corner geometric structure 66 and slot 60 has an alignment tab to guide the sliding assembly. In the example embodiment the alignment tab is a T-lock having a T-lock feature 72 raised relative to the back side of geometric structure 66 and fitting into a groove feature 74 cut into the chamfered punched material of the slot 60. The T-lock engagement in the groove provides precise alignment defined after the punch process creates the slot to ensure that the outer perimeter of the display panel and midplane couple as an aesthetically pleasing assembly. In the example embodiment, the alignment tab feature is included in only the four corners of the assembly. The sliding engagement without any screws allows automated assembly processes, such as robotic handling, and ready disassembly at end of life for recycling and reuse.

Figure 6A:
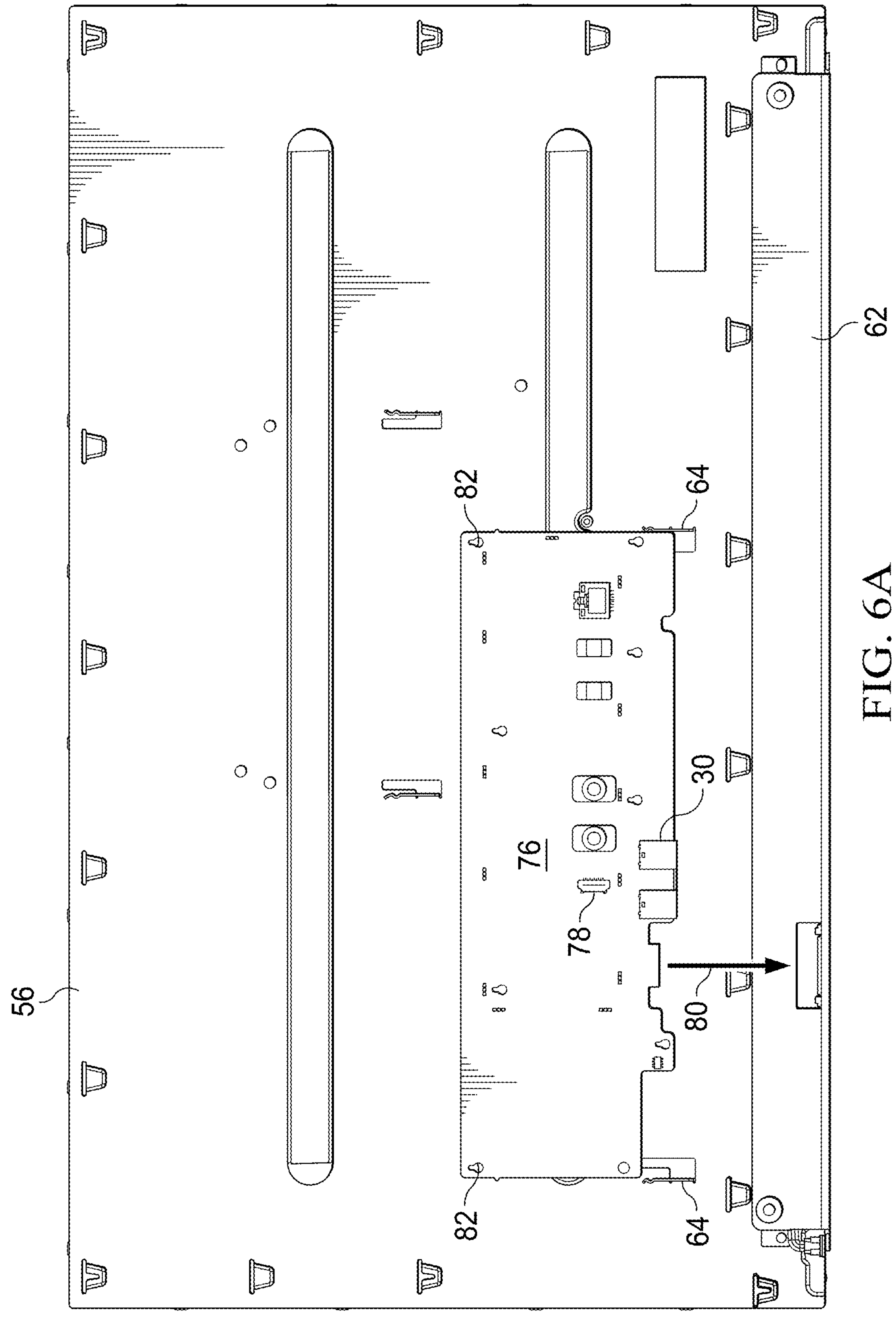
FIGS. 6A and 6B depict a rear view of a sliding assembly of a scalar board at the display panel rear side to directly interface with the timing controller board.
Figure 6B:
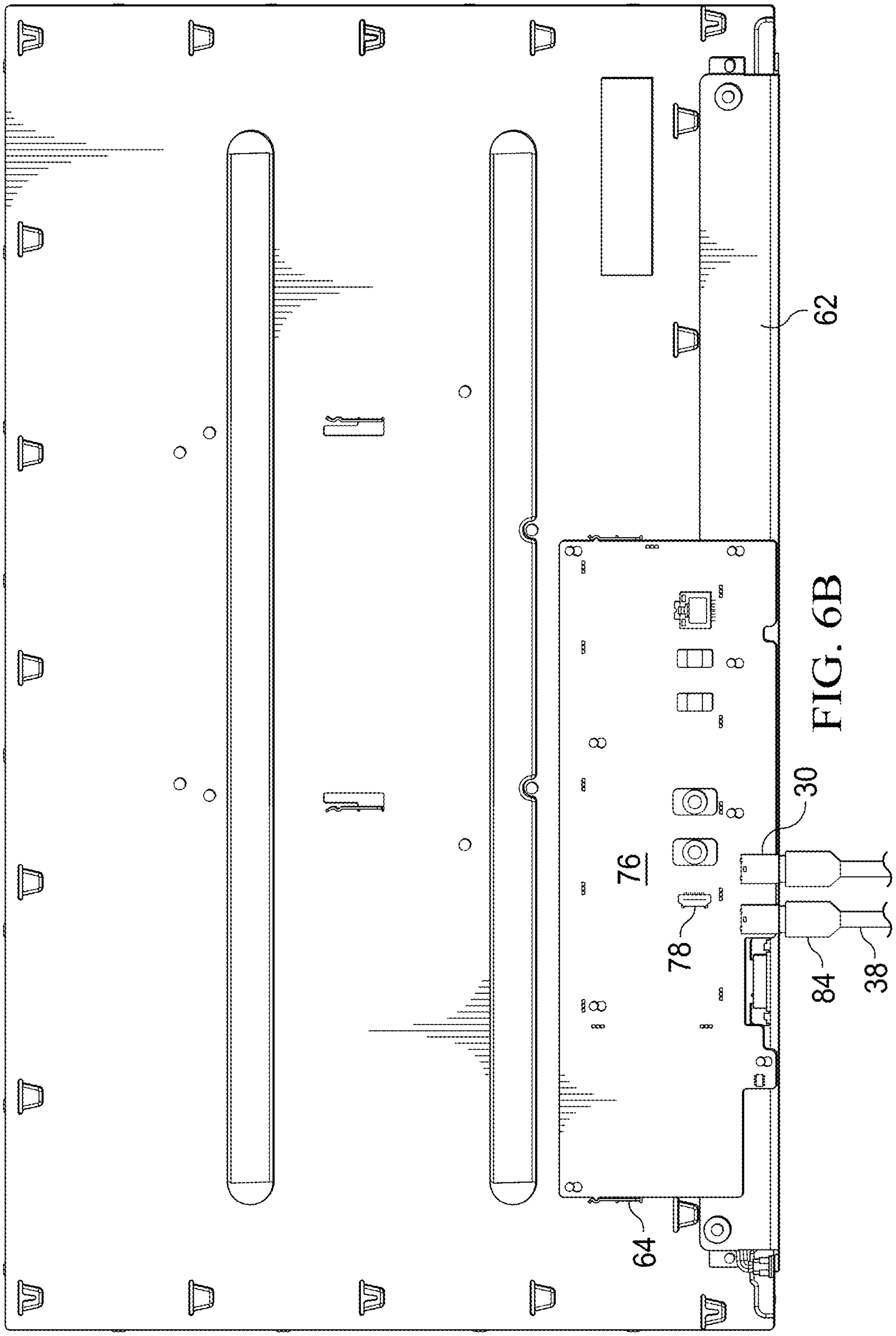

Referring now to FIGS. 6A and 6B, a rear view depicts a sliding assembly of a scalar board 76 at the display panel rear side to directly interface with the timing controller board 62. Timing controller board 62 couples to the display panel rear bottom side to interface with display panel wire lines that communicate pixel values to the display panel pixels. Scalar board 76 has a scalar 78 integrated circuit that includes a processing resource to manage display operations. Scalar 78 accepts visual information from a display cable or other source and formats the visual information so that a timing controller integrated circuit can scan the pixel values to the array of pixels scaled to the display panel resolution. Scalar board 76 includes slots 82 that align with posts 64 so that the scalar board slides relative to the display panel back side 56 in the direction indicated by arrow 80. In addition, posts 64 may provide alignment of the scalar by having a raised surface at each side of the scalar board to define the insertion position. FIG. 6B depicts completion of the sliding movement to engage scalar board 76 against timing controller board 62 so that communication is provided through a direct interface of edge connectors on each board. Display cable connectors 84 of display cables 38 couple to display cable ports 30 that surface mount on scalar board 76 and interface with scalar 78. The display cable connection provides communication of visual information and/or communication of power between an information handling system and the peripheral display.

Figure 7:
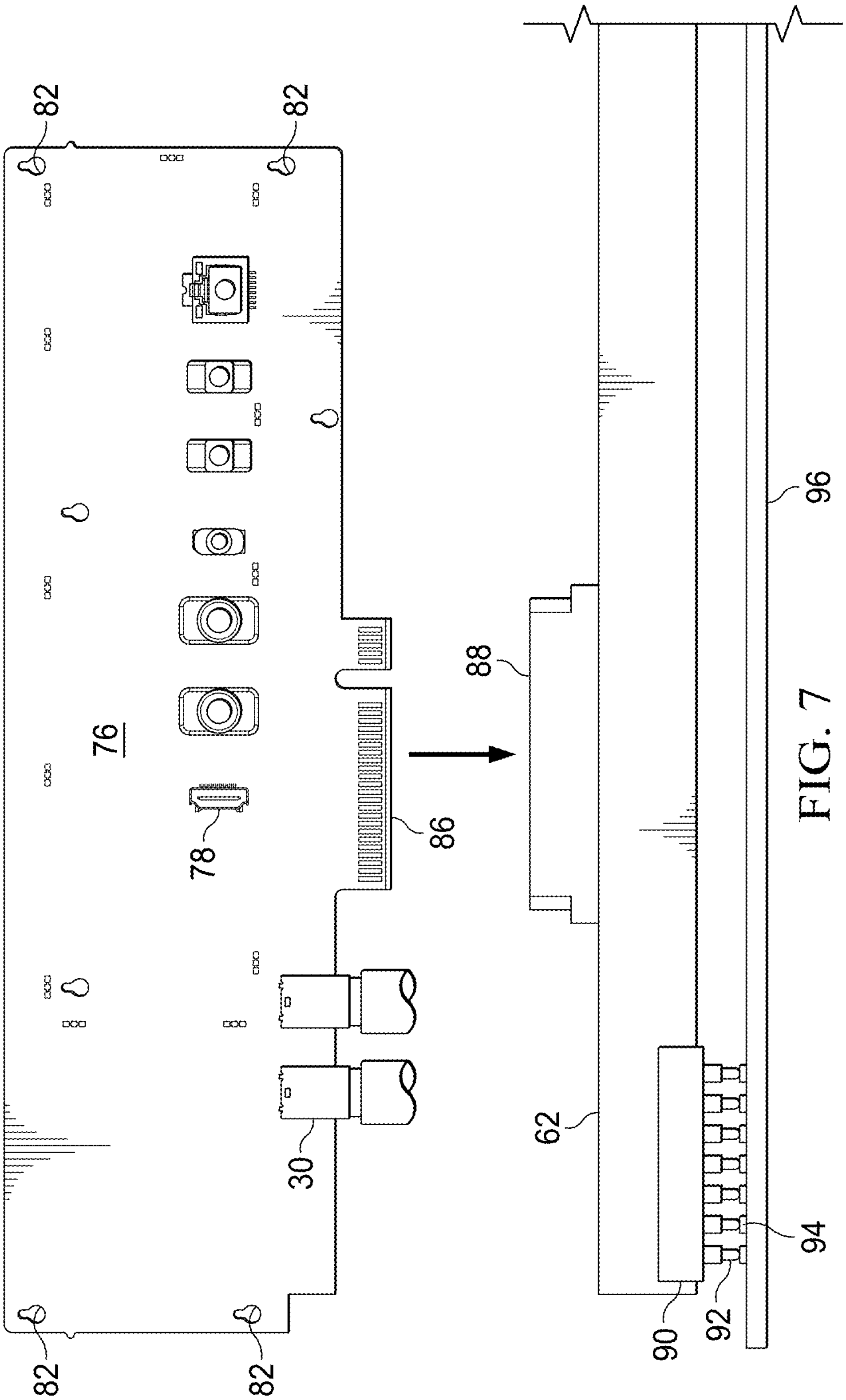
FIG. 7 depicts a side view with details of one example embodiment of a direct interface between a scalar board and a timing controller board.

Referring now to FIG. 7, a side view depicts details of one example embodiment of a direct interface between a scalar board 76 and a timing controller board 62. In the example embodiment, scalar board has teardrop shaped slots 82 that accept a post at a larger circumference and hold the scalar board in position when the posts slide to the end of a smaller circumference portion. The fully installed position couples an M.2 edge connector 86 coupled at a bottom side of scalar board 76 to an M.2 edge connector portion 88 so that installation of scalar board 76 completes the logic and power interface with the timing controller board 62 by a direct interface that does not use cables. In addition to communication of visual information from scalar 78 to a timing controller, the M.2 connector interface also communicates power between the boards. In one example embodiment, power is provided from a regulated power source to the scalar board and then communicated to the timing board. In alternative embodiments, power can be directed from the cable connector ports 30 and then distributed to the timing controller board and a power board as described below. In the example embodiment, an LCD display panel has a backlight 96 coupled to a bottom side that illuminates the LCD pixels to present visual images. Power provided from scalar board 76 to timing controller board 62 is communicated to the backlight by a direct interface having a spring-biased connector 90, such as pogo pins 92, aligned with contact pads 94 of the backlight 96. The direct interface by proximity of the boards supports power transfer without cables, also improving manufacturing, reuse and recycling of the scalar board, timing board and backlight. Although the example embodiment depicts an LCD display panel that is illuminated by a backlight, alternative embodiments may have an OLED display panel that does not use a backlight so that spring-biased connector may be left unpopulated. In an alternative embodiment, the spring-biased connector may couple to the scalar board and extend from the scalar board down to the backlight so that power is transferred directly from the scalar board to the backlight instead of through the timing controller board.

Figure 8A:
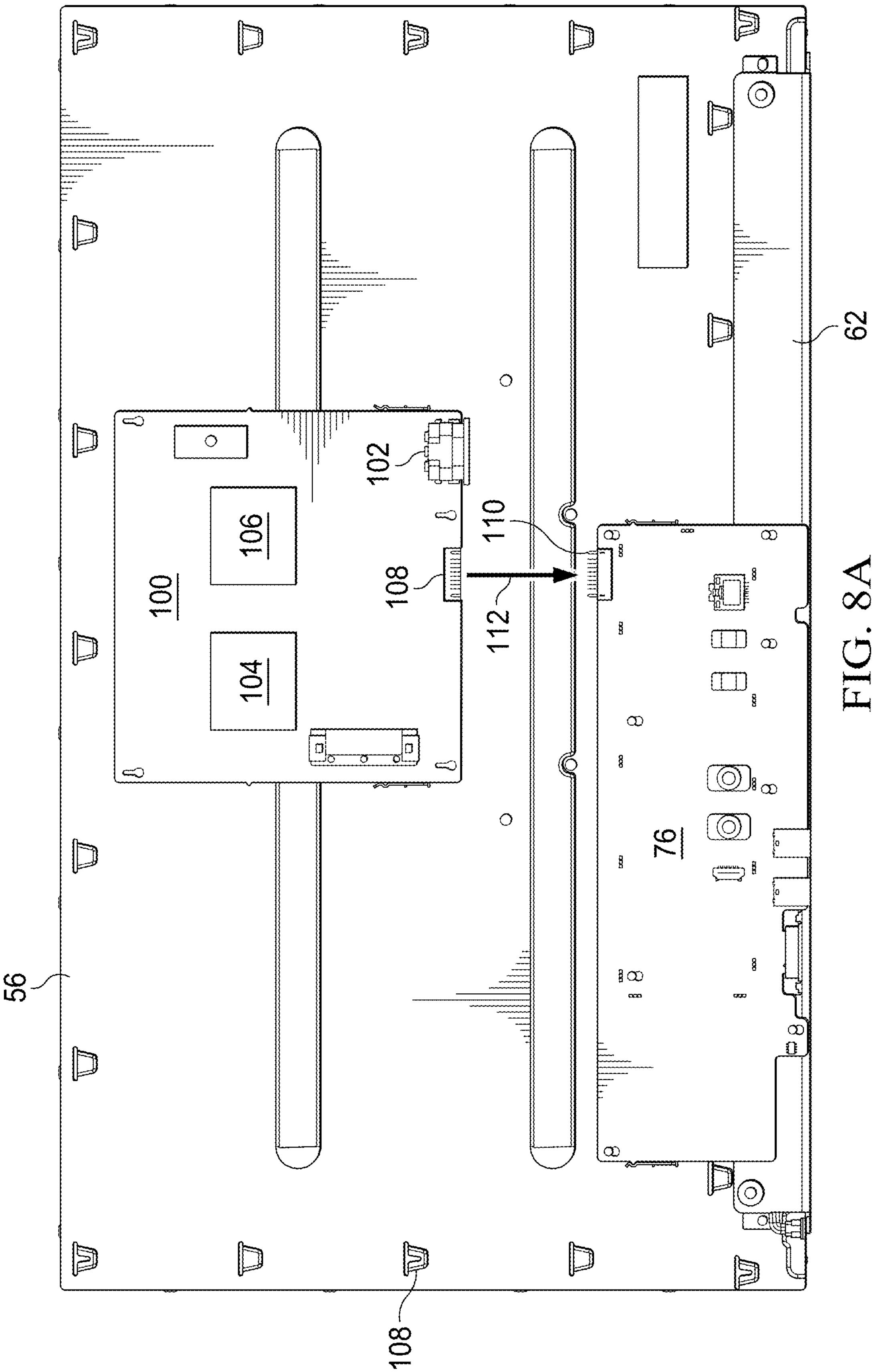
FIGS. 8A and 8B depict a rear view of a sliding assembly of a power board at the display panel rear side to directly interface with the scalar board.
Figure 8B:
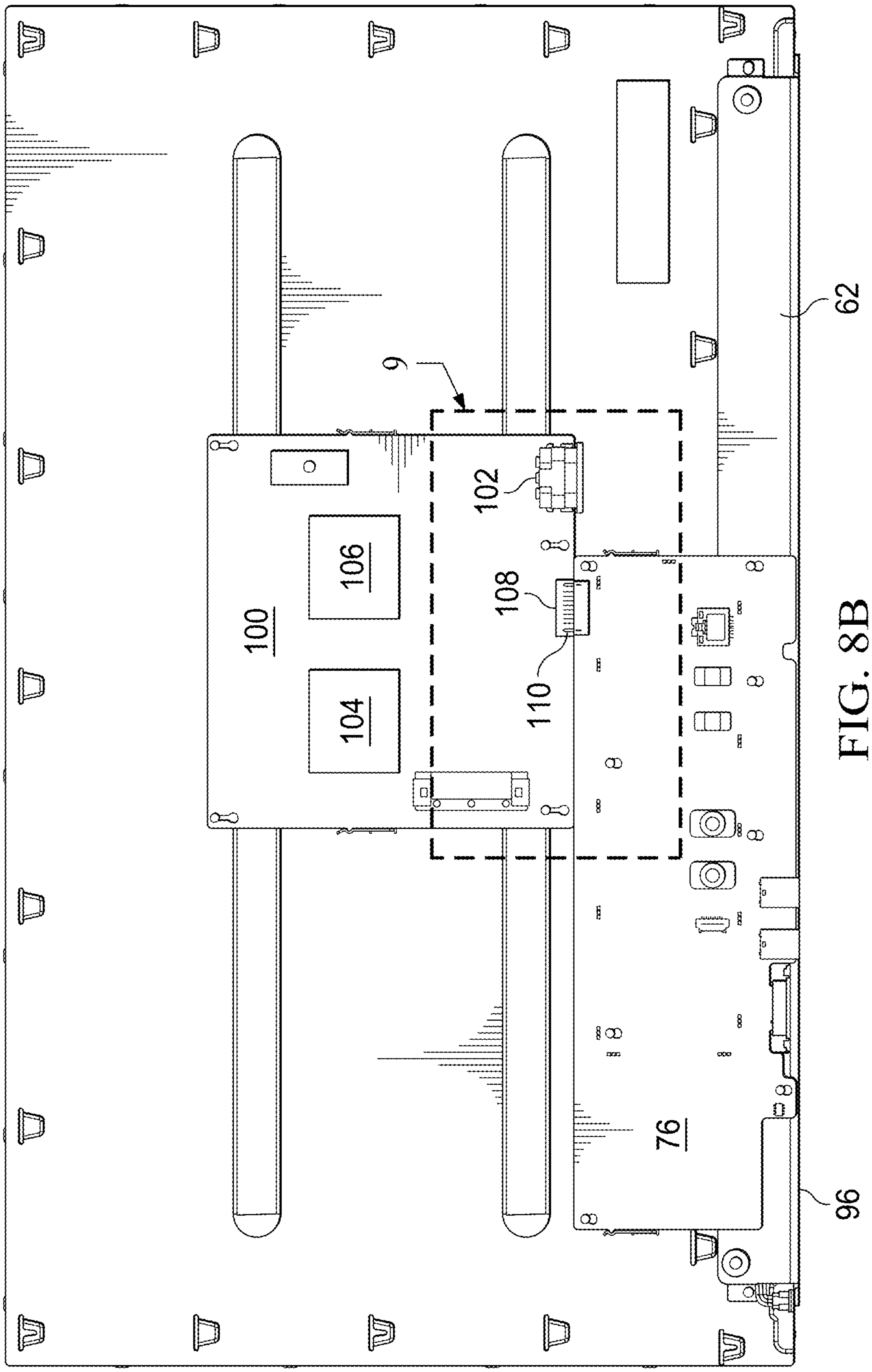

Referring now to FIGS. 8A and 8B, a rear view depicts a sliding assembly of a power board 100 at the display panel rear side to directly interface with the scalar board 76. In the example embodiment, power board 100 has an AC-to-DC adapter 104 and an uninterruptable power supply (UPS) 106. AC-to-DC adapter 104 accepts external AC power through an AC plug 102 and converts the AC power to a regulated DC power that supplies the electronic components of the peripheral display. In one alternative embodiment, power board 100 may also have a DC power connector plug, such as a barrel connector port or a Type C USB connector port, so that an external DC adapter can also be used to power the peripheral display. UPS 106 includes a processing resource and battery that will operate the peripheral display for a limited time in the event of a sudden power loss. In alternative embodiments, the battery may be coupled to the display panel rear side and interfaced by a power port with the power board so that the UPS processing resource can quickly adapt to a power loss by providing power from the battery. Power board 100 has a power socket 108 coupled at a bottom side that aligns with a power connector 110 of scalar board 76 so that a sliding motion of power board 100 down against scalar board 76 as shown by arrow 112 inserts pins out of power connector 110 into power socket 108. Once power board 100 directly interfaces with scalar 76, power transfers from power board 100 through scalar 76 and timing controller board 62 to backlight 96 as described above without any cable connections.

Figure 9:
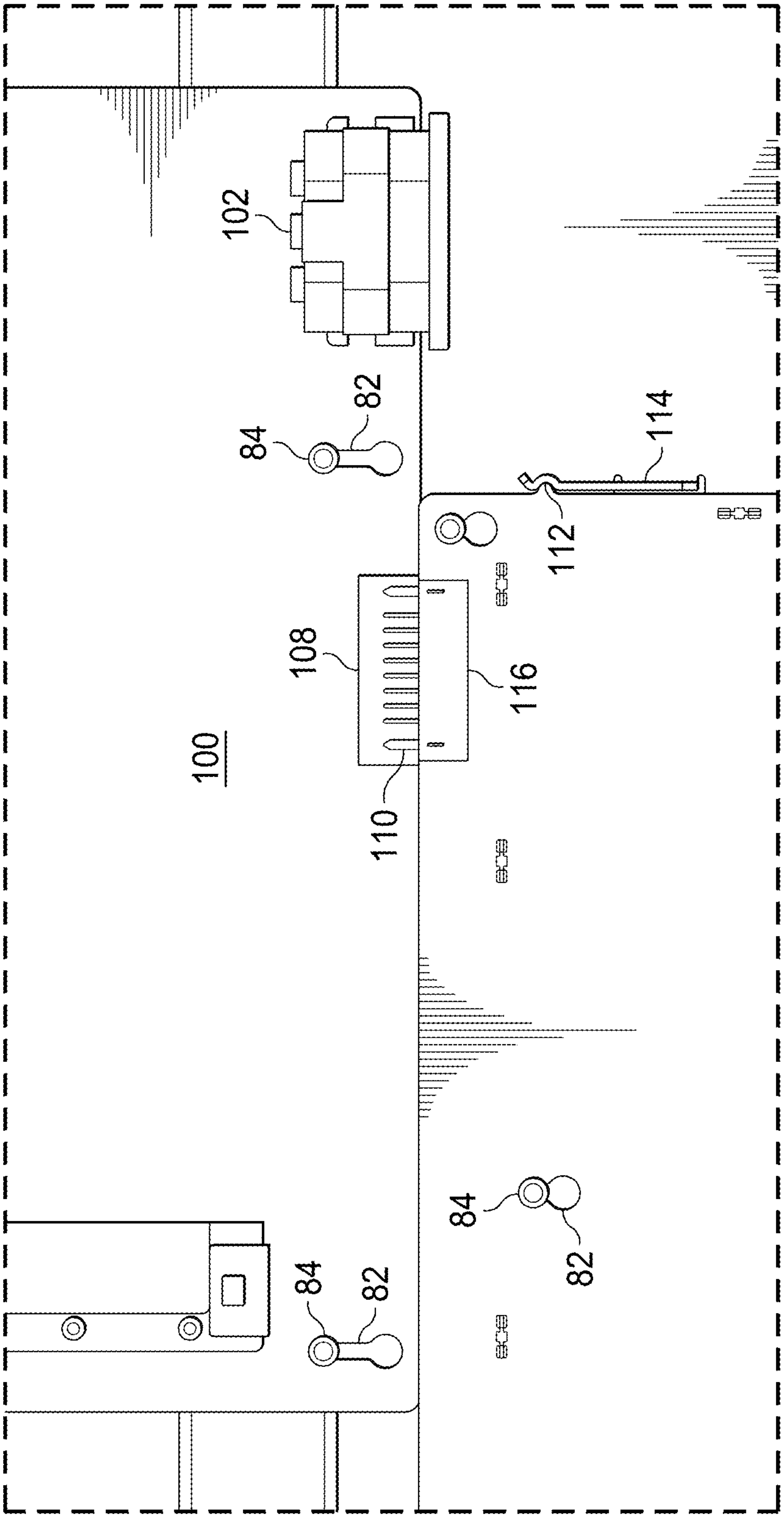
FIG. 9 depicts a side view with details of one example embodiment of a direct interface between a scalar board and a power board.

Referring now to FIG. 9, a side view depicts details of one example embodiment of a direct interface between a scalar board 76 and a power board 100. In the example embodiment, scalar board 76 and power board 100 each have teardrop shaped slots 82 that accept a post 84 at a larger circumference and hold the board in position when the posts slide to the end of a smaller circumference portion of the slot. Scalar board 76 couples to the display panel back side first followed by a sliding engagement of power board 100 so that power plug 116 with power connectors 110 inserts into power plug 108. Insertion of the pin configuration of power connectors 110 into the socket helps to ensure that power is not available from power board contacts that are exposed without a scalar connected in place, such as if AC power couples to AC connector 102. At one side of scalar board 76 an extension 112 is formed in the board to align with a snap connector 114 that snaps into place a full insertion of the scalar board slots onto the posts. Other types of snaps or locks may be used to ensure that the circuit boards remain in position once slid onto the posts. Snap connectors and similar tool-less coupling devices remove the need for securing boards in place with screws, thereby improving assembly and disassembly efficiency and enabling the use of automated assembly and disassembly, such as robotic tools.

Figure 10A:
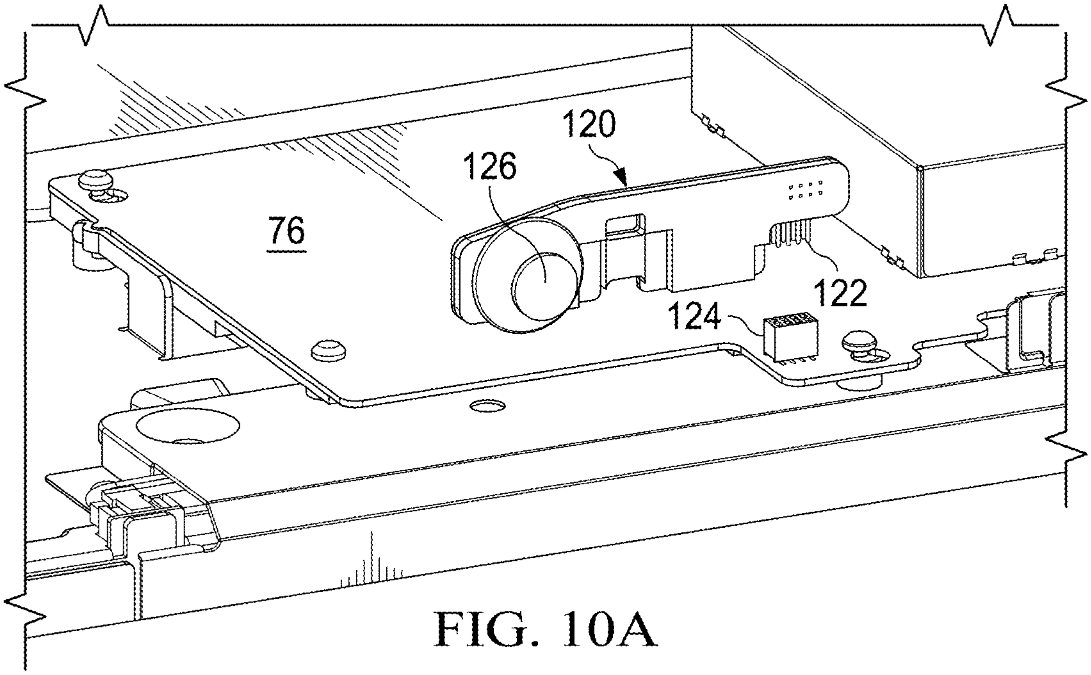
FIGS. 10A and 10B depict a rear perspective view of assembly of a riser board at the display panel rear side to directly interface with the scalar board.
Figure 10B:
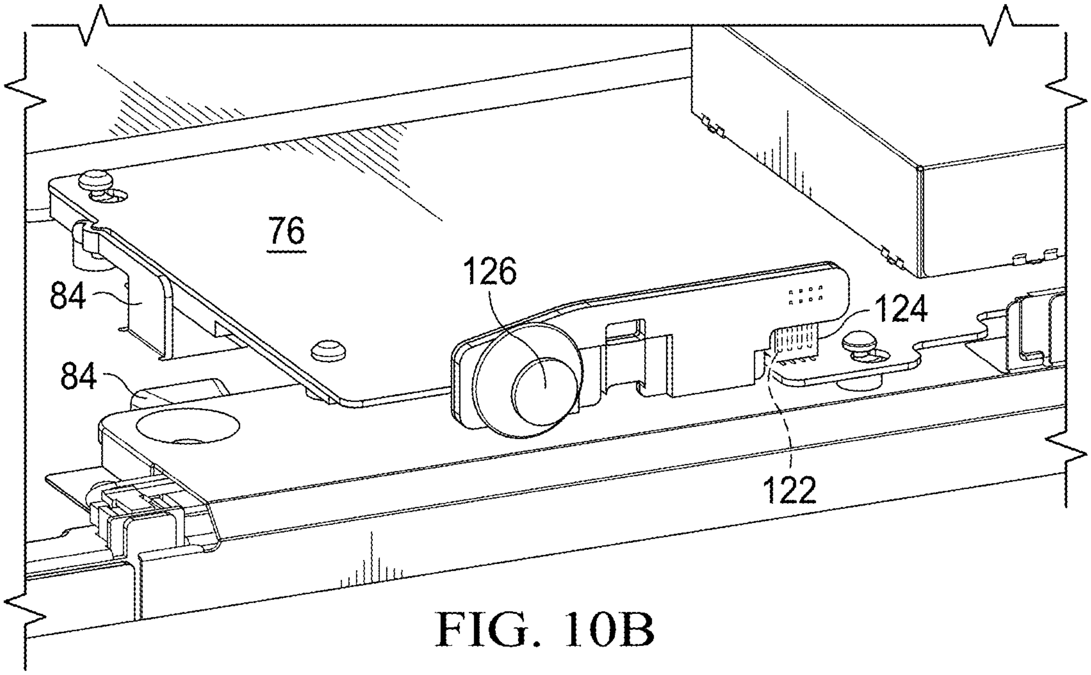

Referring now to FIGS. 10A and 10B, a rear perspective view depicts assembly of a riser board 120 at the display panel rear side to directly interface with the scalar board 76. In the example embodiment, riser board 120 includes a five-position joystick 126 that extends downward to be exposed at the outer housing of the peripheral display for accepting end user inputs to manage peripheral display functions through an onscreen display menu (OSD). FIG. 10A depicts insertion of riser board 120 perpendicular to scalar board 76 so that a logic plug 122 of riser board 120 inserts into a plug 124 surface mounted to scalar board 76. FIG. 10B depicts riser board 120 coupled into place so that the bottom side of the riser board rests against the bottom of scalar board 76 to help withstand inputs made at joystick 126. Other supports, such as a snap coupler at the bottom surface of the riser board, can offer additional support to withstand inputs at the joystick. In the example embodiment, a post 84 bent up from the display backside rests against a vertical side of scalar board 76 to help maintain the scalar board position and also guide the scalar board during sliding coupling with the display panel back side.

Figure 11:
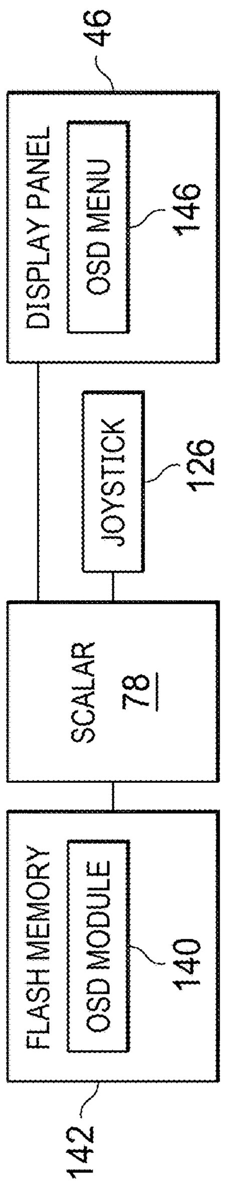
FIG. 11 depicts a block diagram of logical elements that interface joystick inputs to an OSD menu presented at the display panel.

Referring now to FIG. 11, a block diagram depicts logical elements that interface joystick inputs to an OSD menu presented at the display panel. In the example embodiment, joystick 126 interfaces with scalar 78 to accept end user inputs at the display to manage display operating conditions, such as brightness, contrast, input source and other selectable operating conditions. Scalar 78 is a processing resource that executes instructions of an OSD module 140 stored in a flash memory 142 or other non-transitory memory. Scalar 78 presents an OSD menu 146 at display panel 46 based upon the inputs made to joystick 126.

Figure 12:
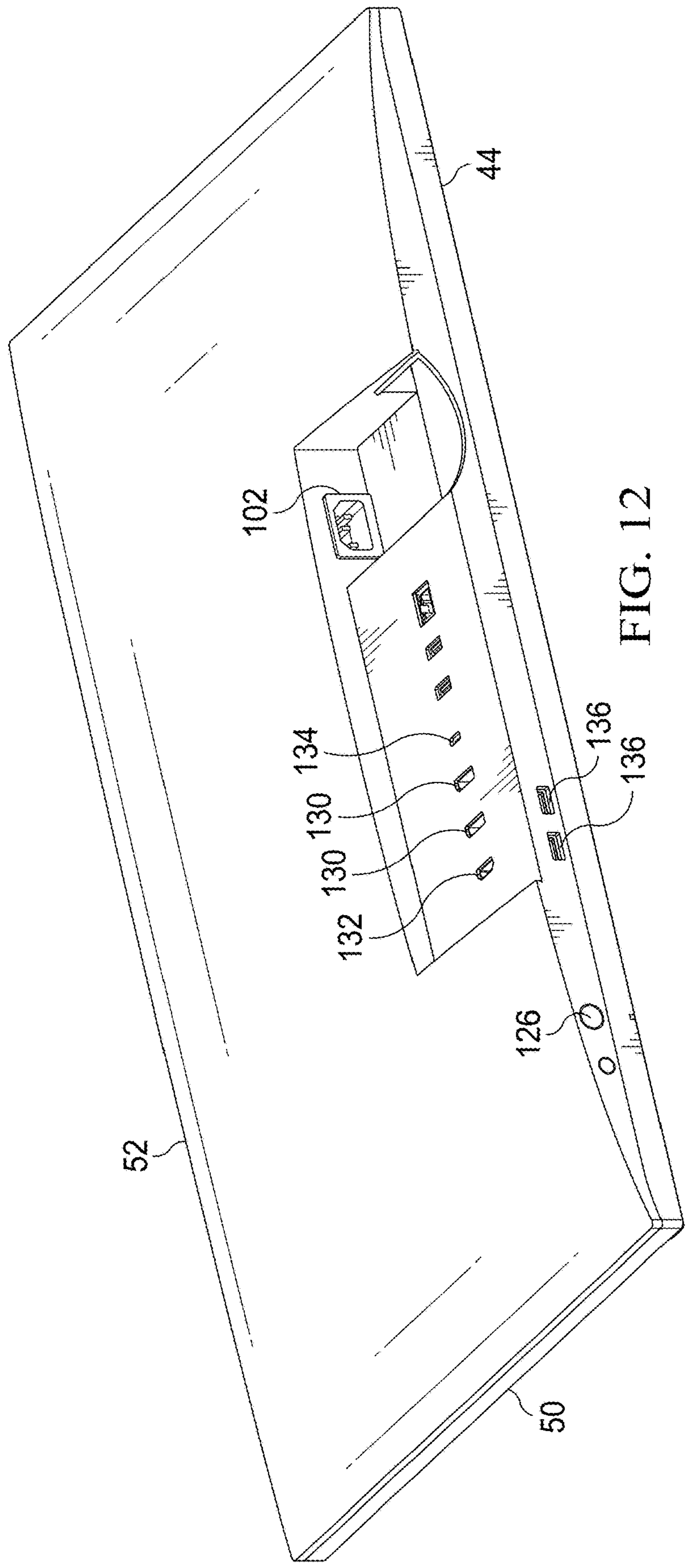
FIG. 12 depicts a rear perspective view of the display assembly with an example configuration of connection ports to accept power and information.

Referring now to FIG. 12, a rear perspective view of the display assembly depicts an example configuration of connection ports to accept power and information. In the example embodiment, a cover 52 of injection molded plastic couples to midplane 50 to define a cavity at the back side of display panel 44 where the electronic components are coupled as described above. Power AC cable port 102 is exposed to accept an AC power cord that provides power from an AC socket for use by the power board. At a rear side of cover 52 plural display cable ports are exposed to accept display cables, including a DisplayPort ports 130, HDMI ports 132, and Type C USB ports 134, each of which surface mounts to the scalar board as described above. Along the bottom side of cover 52, additional display cable ports 136 are exposed as is joystick 126. The example embodiment depicts the cable ports as exposed at openings of cover 52, however, in alternative embodiments, some or all of the cable ports may be exposed at openings of midplane 50.

Figure 13:
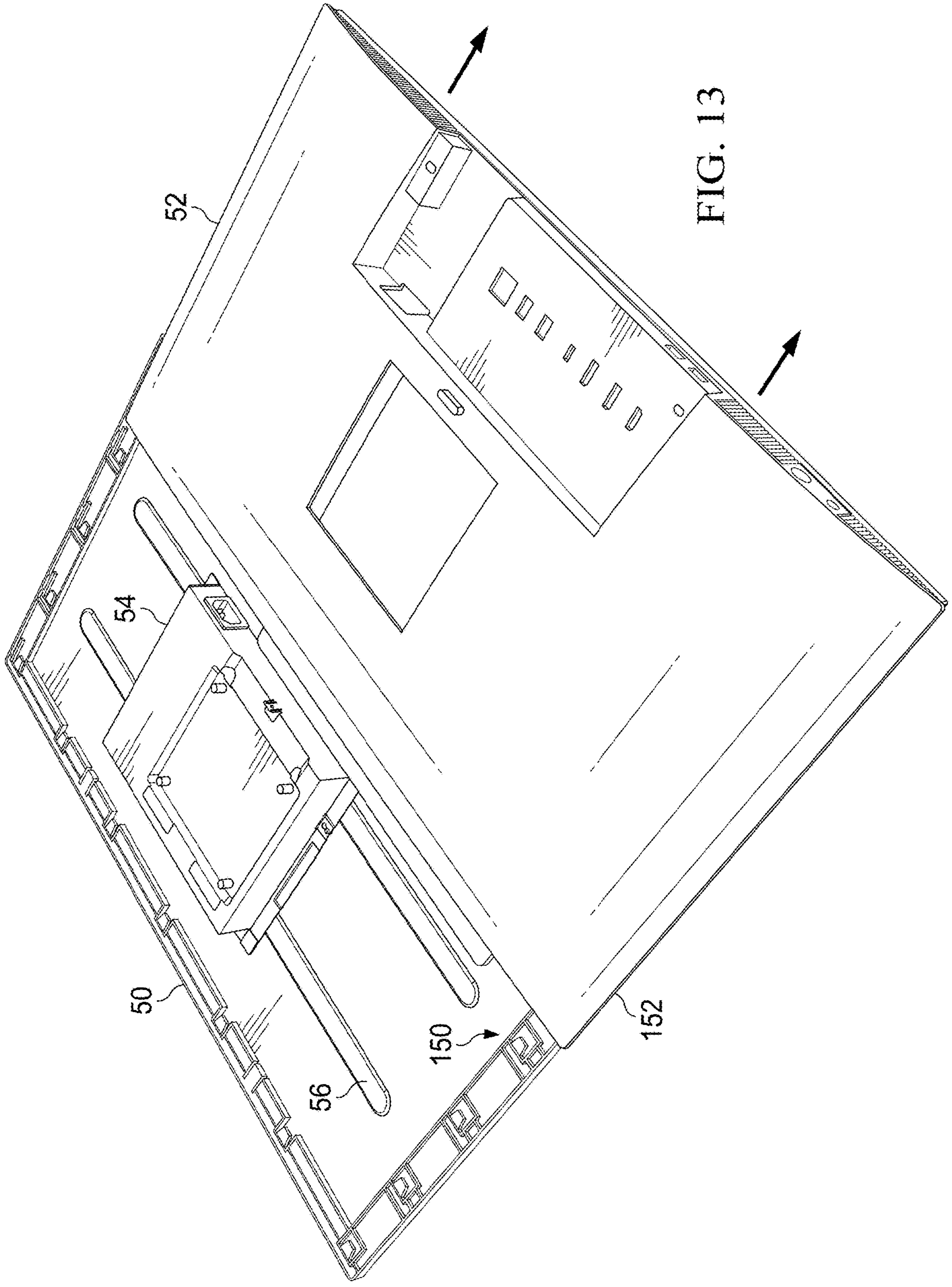
FIGS. 13 and 13A depict an example embodiment of tool-less attachment of the cover to the midplane to define a cavity at the display panel backside for assembly of electronic components.
Figure 13A:
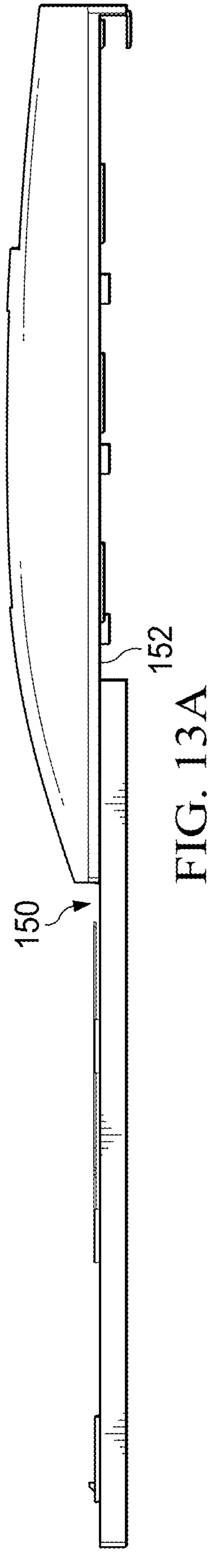

Referring now to FIGS. 13 and 13A, an example embodiment depicts tool-less attachment of the cover to the midplane to define a cavity at the display panel backside for assembly of electronic components. In the example embodiment, cover 52 slides relative to midplane 50 and back side 56 to enclose and expose electronic components coupled in the cavity defined between cover 52 and back side 56. Stand support 54 snaps to back side 56 over the power board to offer a VESA standard coupling arrangement of the display assembly to the display stand. In the example embodiment, cover 52 slides with respect to midplane 50 through a rail and guide structure 150 and 152 as detailed in FIG. 13A. In one embodiment, guide structure 150 coupled to midplane 50 are tabs that extend out at each geometric structure. When cover 52 slides to full engaged position so that a snap and snap connector lock in place, the top and bottom edges align with the top and bottom edges of midplane 50 to give an aesthetically pleasing but readily disassembled solution so that automated techniques may be used and end of life, such as robotic arms.

Figure 14:
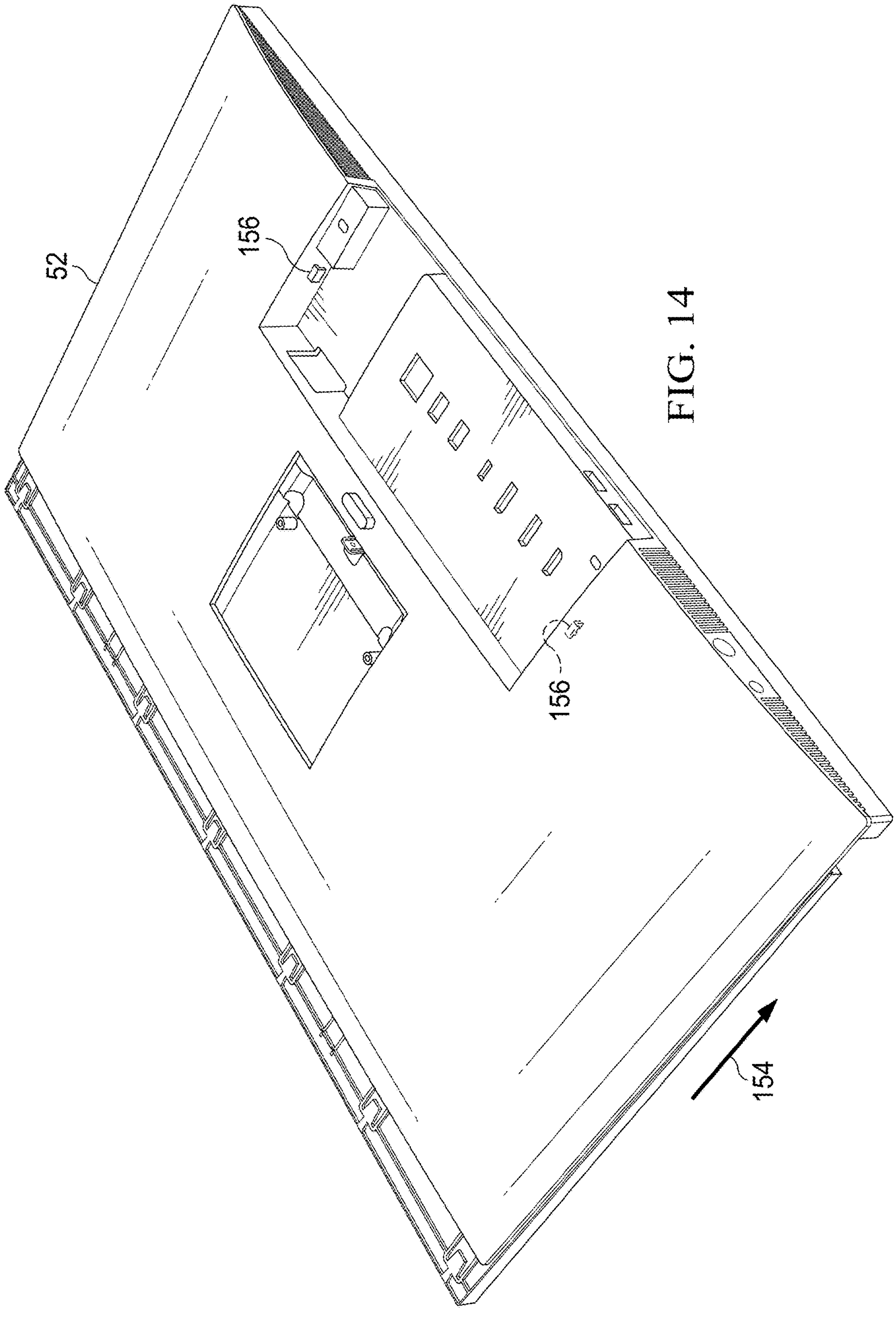
FIGS. 14, 14A and 14B depict an example embodiment of a latch mechanism for securing the cover to the midplane in a releasable manner.
Figure 14A:
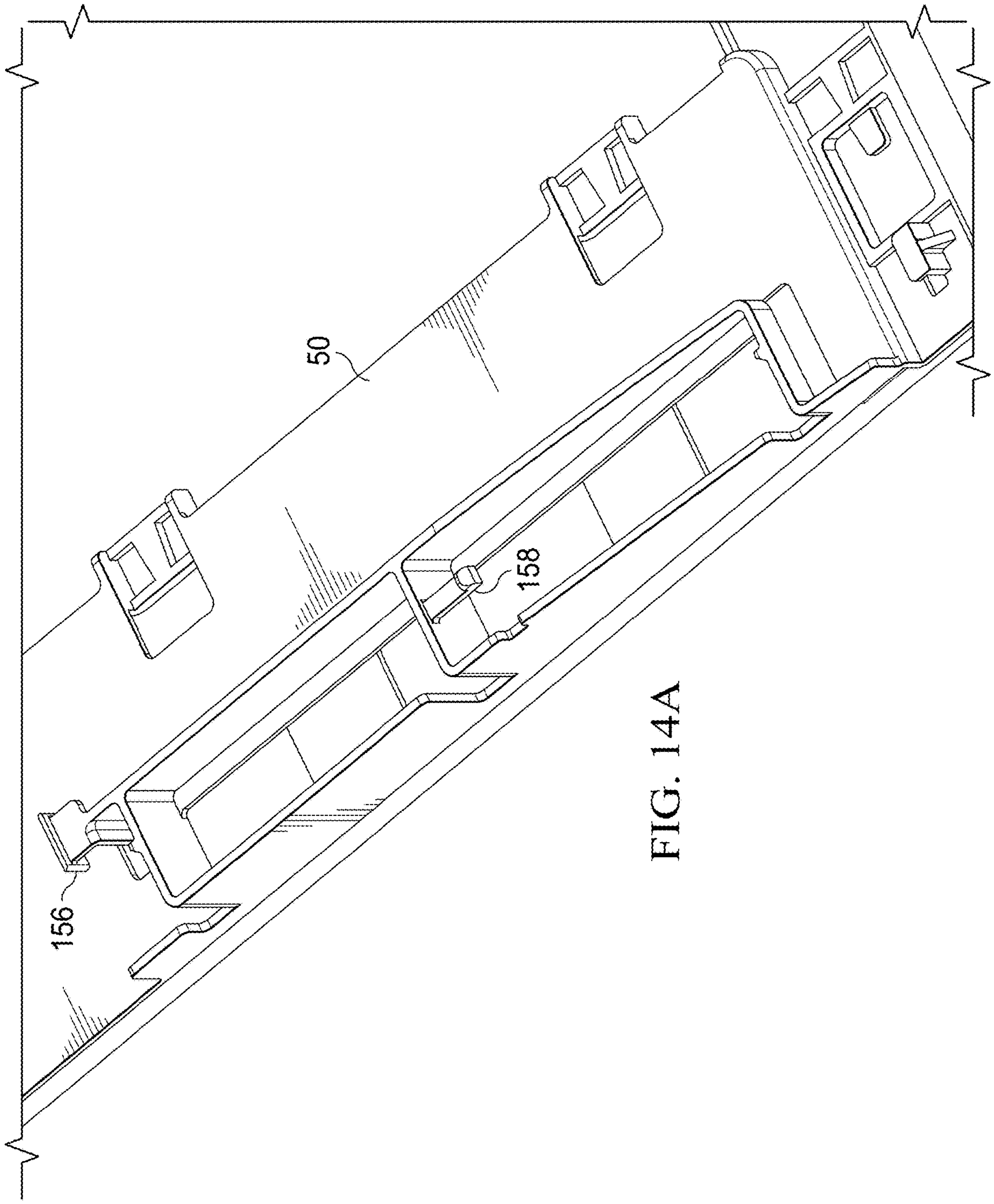
Figure 14B:
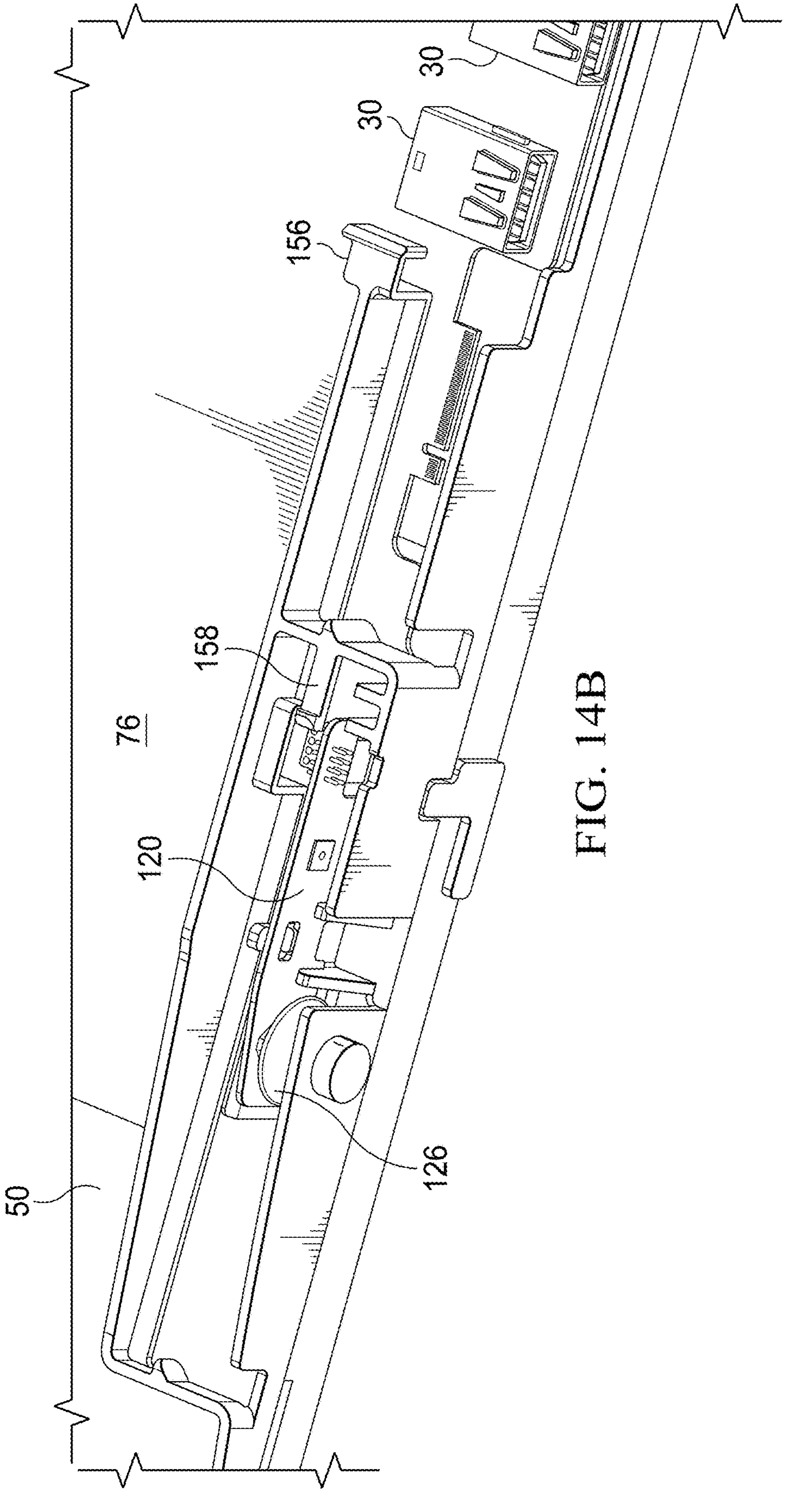

Referring now to FIGS. 14, 14A and 14B, an example embodiment depicts a latch mechanism for securing the cover to the midplane in a releasable manner. FIG. 14 depicts a rear perspective view of the display assembly having a release handle 156 pressed at the bottom side of cover 52 to release the cover to slide free as indicated by arrow 154. FIG. 14A depicts a sectional view of midplane 50 having the right side latch mechanism to hold cover 52 in place and FIG. 14B depicts midplane 50 having the left side latch mechanism. Release handle 156 presses down to move a latch 158 at a midway point of the handle so that the latch 158 releases from a member within cover 52. When latch 158 presses to a released position, cover 52 slides to remove from the display assembly rear side. When release handle 156 is let go, it biases upward to a latch position so that latch 158 engages with the cover to hold the cover in place. During sliding assembly of cover 52, latch 158 yields to the internal member on the cover and then snaps into place when the cover fully slides into position. FIG. 14B depicts the left side release handle 156 positioned over scalar board 76 and displaced from joystick 126 and riser board 120 so as not to interfere with display operations in either the released or latched positions. In one example embodiment, pressing release handle 156 may turn off power at the display as described below.

Figure 15:
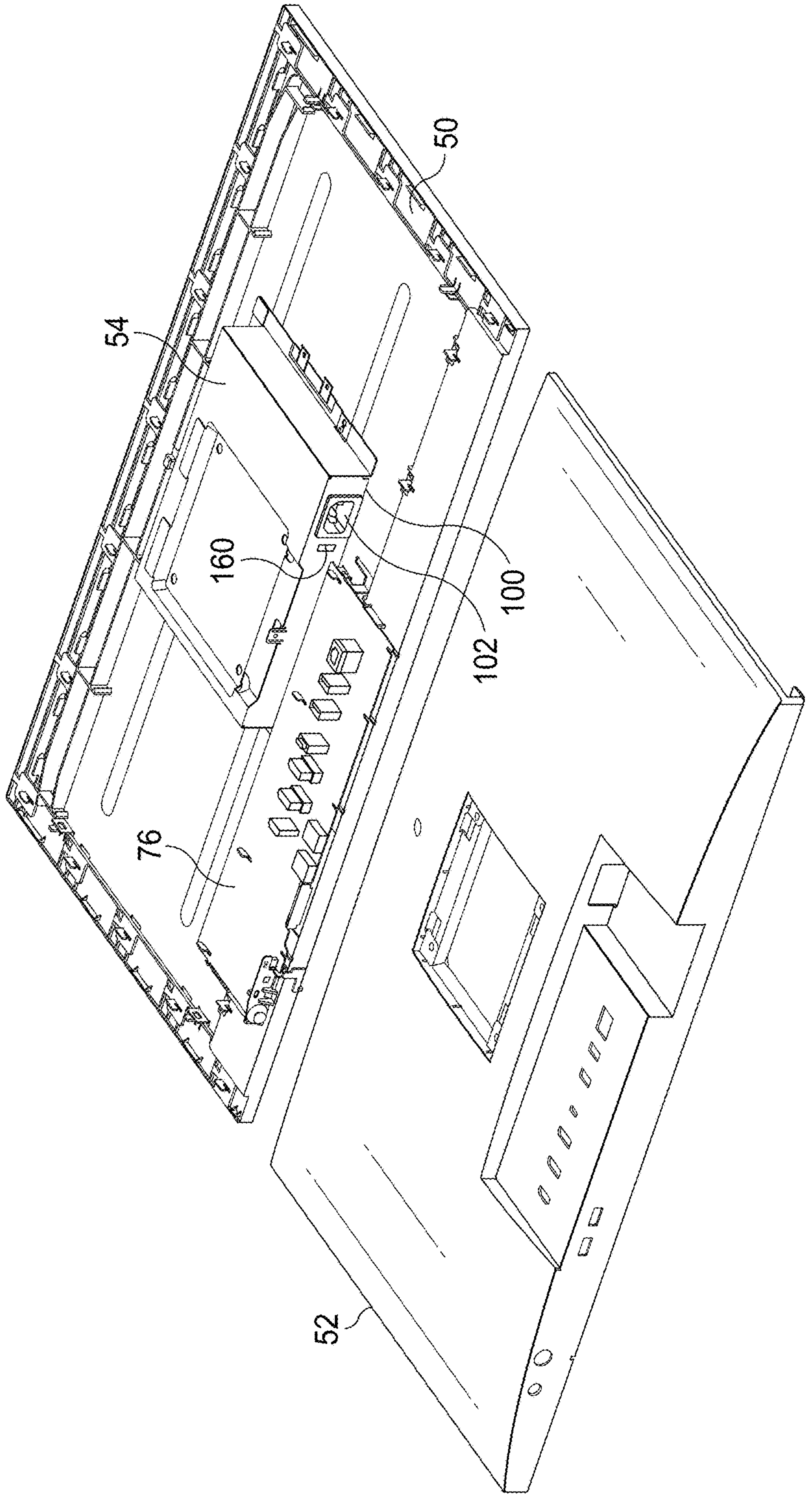
FIG. 15 depicts a rear perspective view of the display assembly having the cover removed and power automatically disabled.

Referring now to FIG. 15, a rear perspective view depicts the display assembly having the cover removed and power automatically disabled. In the example embodiment, cover 52 is positioned to insert onto midplane 50 and slide to enclose the display assembly electronic components. Scalar board 76 is positioned at the bottom side of the display assembly to expose display cable connector ports. Stand support 54 couples in place over power board 100 to align with a central region of cover 52 where a VESA display stand can couple into place. AC power connector 102 is exposed at the bottom side of stand support 54 and aligned with an opening of cover 52 to accept an AC power plug. A power cut off switch 160 is located at an opening of stand support 54 and aligned to accept a member of cover 52 when cover 52 slides into position. When cut off switch 160 is activated, power is available from power board 100. When cut off switch 160 is not activated power is turned off at power board 100 so that the electronic components will not receive power. In one embodiment, cut off switch 160 is a mechanical switch activated by a physical member of cover 52 that contacts the mechanical switch when cover 52 is slid fully on. In another embodiment, cut off switch 160 is a Hall sensor that is activated when a magnet coupled to cover 52 is proximate the Hall sensor at full insertion of cover 52 on midplane 50.

Figure 16:
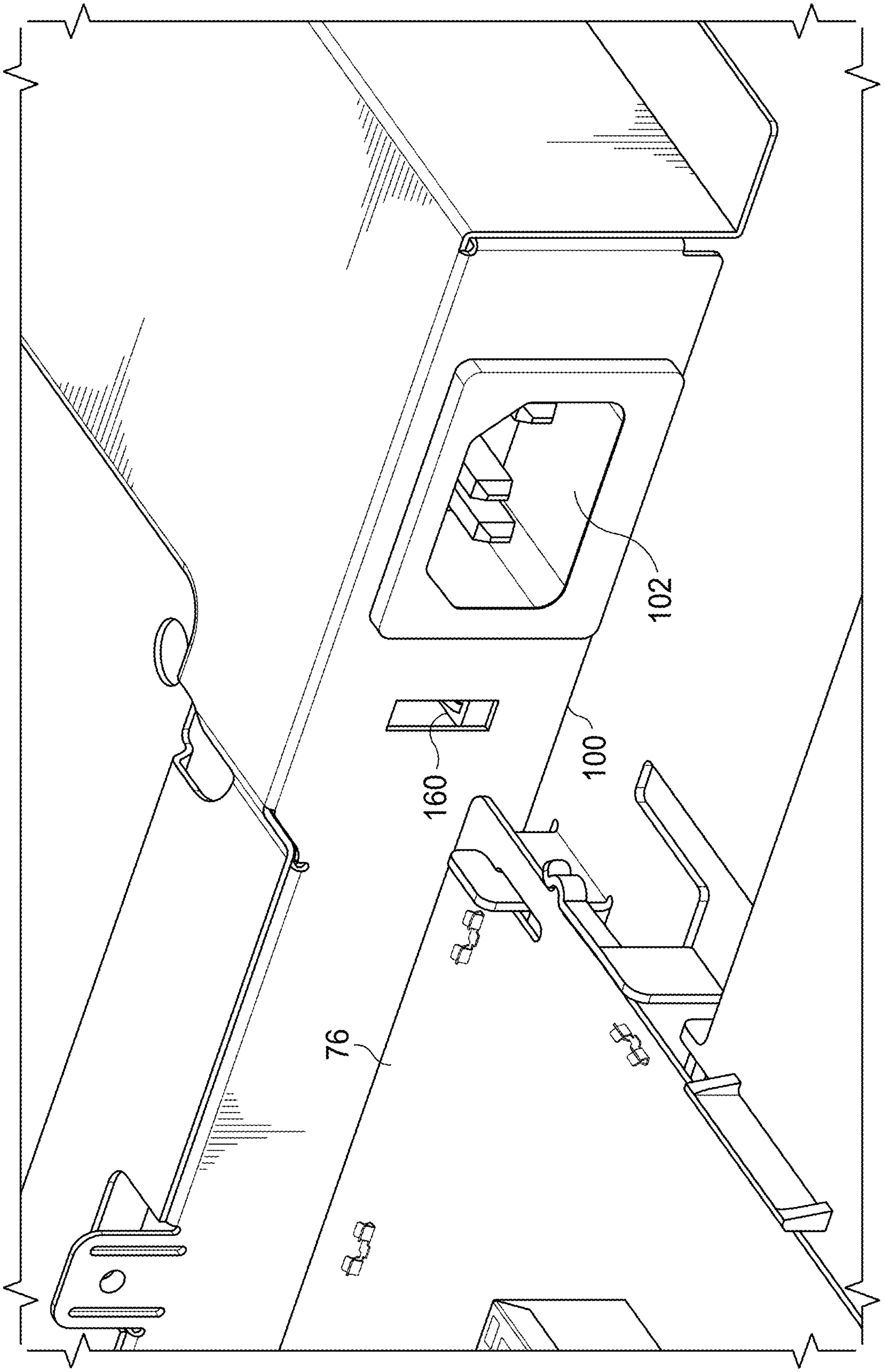
FIGS. 16, 16A and 16B depict a detailed view of an example embodiment of the cut off switch.
Figure 16A:
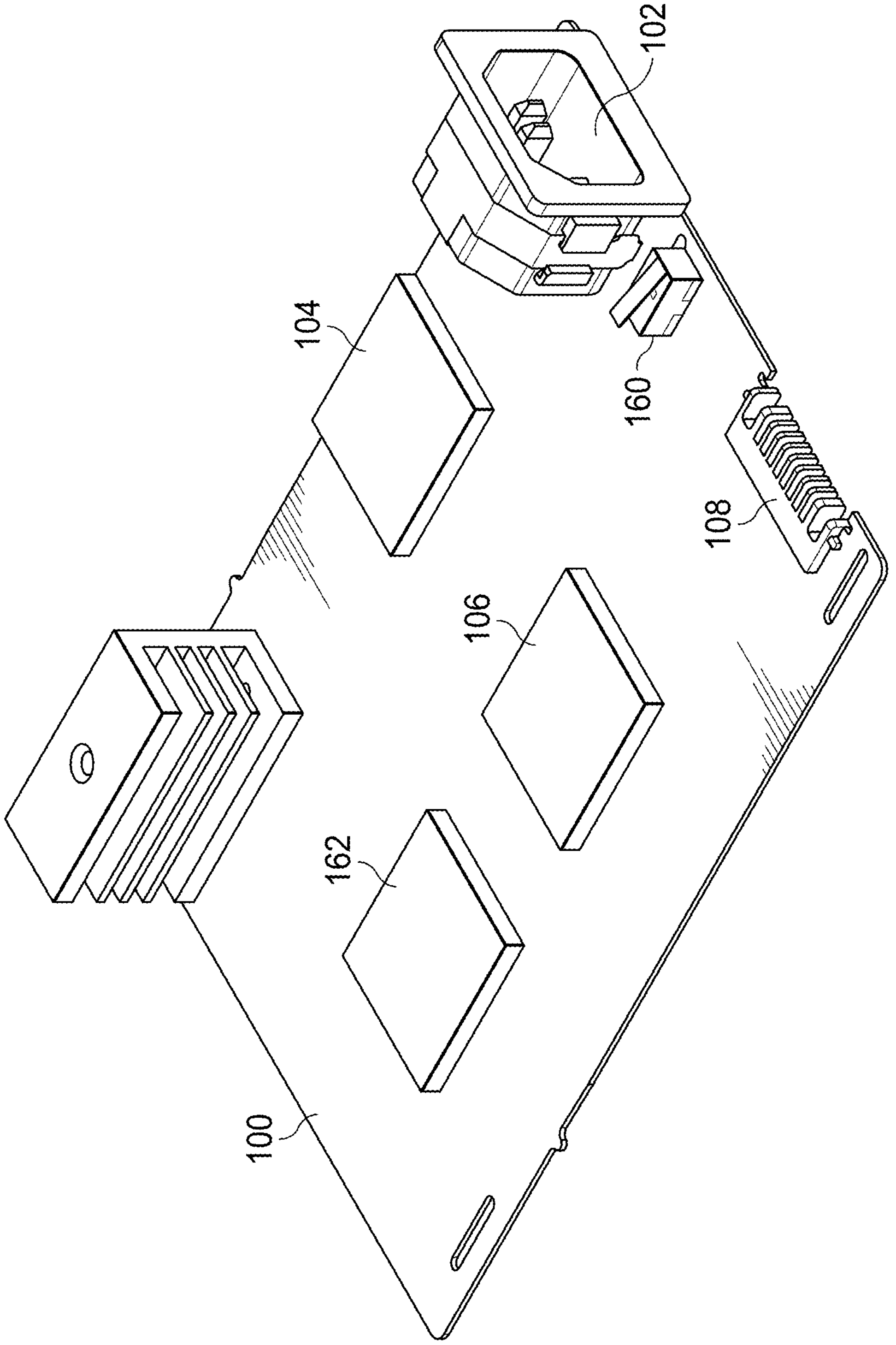
Figure 16B:
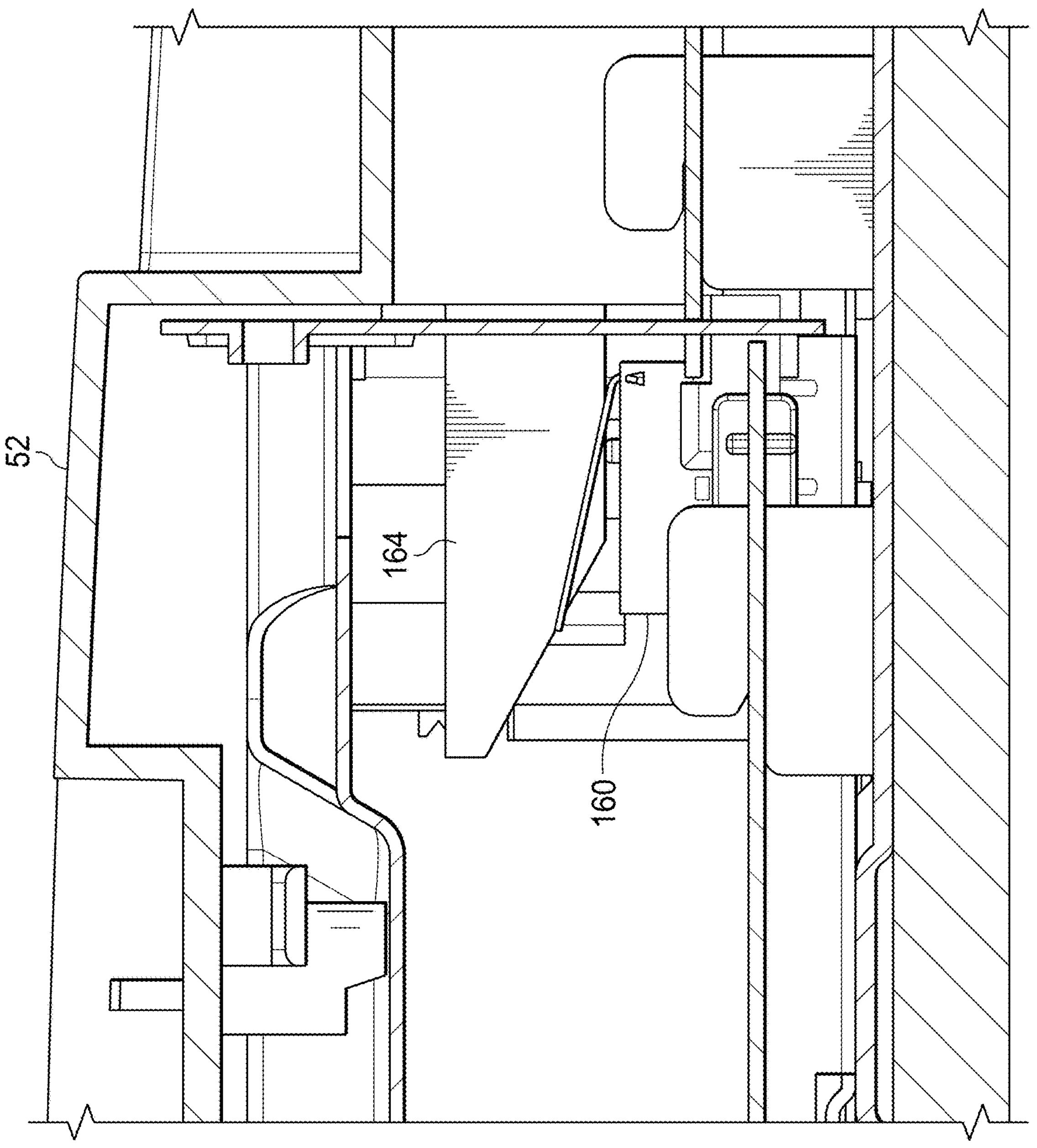

Referring now to FIGS. 16, 16A and 16B, a detailed view of an example embodiment of the cut off switch is depicted. In the example embodiment, cut off switch 160 is a mechanical switch biased to an open position when the cover is removed so that power input at AC cable port 102 will not be available from power board 100 for use in electronic components of the display assembly. FIG. 16A depicts power board 100 having an AC-to-DC converter 104, a UPS 106 and a processing resource 162 that manages operation of the power components. Cut off switch 160 interfaces with processing resource 162, such as microcontroller unit (MCU), so that the open position is detected to turn off power supply from the AC-to-DC converter and UPS and thereby prevent availability of power at power socket 108. FIG. 16B depicts a side sectional view of cover 52 assembled over the power board so that a member 164 of cover 52 presses down on and closes cut off switch 160, thereby enabling power distribution from the power board out of the power socket.

Figure 17:
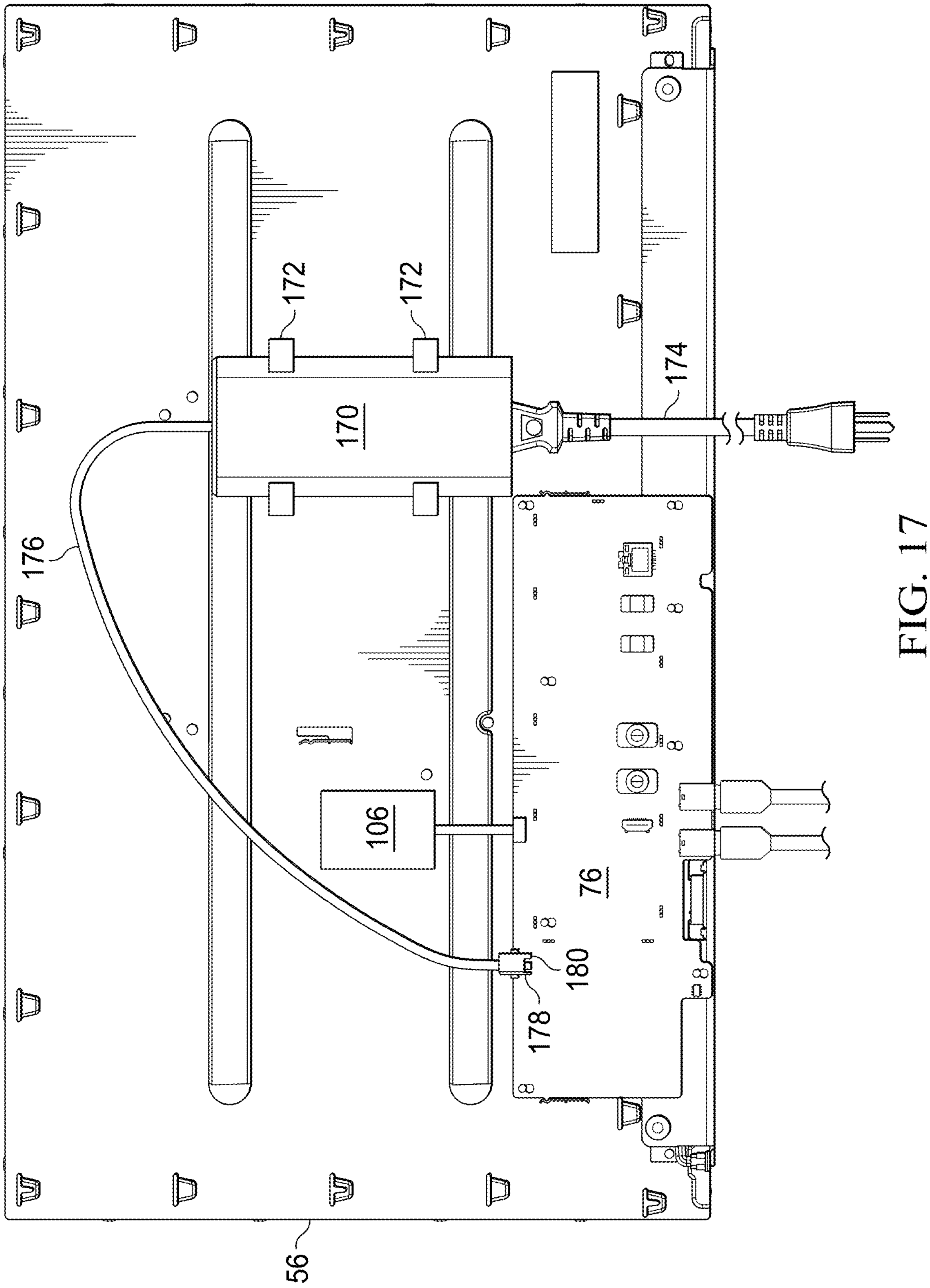
FIG. 17 depicts an example embodiment of an external AC-to-DC power adapter coupled into the cavity defined between the display panel back side and cover as a power supply in the place of a power board.

Referring now to FIG. 17, an example embodiment depicts an external AC-to-DC power adapter 170 coupled into the cavity defined between the display panel back side 56 and cover as a power supply in the place of a power board. A frame 172 engages with AC-to-DC power adapter 170 to hold it in position so that an AC power cord 174 can insert through cover into a power connector of the adapter. A power cable 176 terminating in a power connector 178, such as a Type C USB or barrel connector, communicates power and power adapter information to a power connector port 180 surface mounted to scalar board 76, such as a Type C USB cable port or a barrel connector port. AC-to-DC power adapter 170 is packaged for external use, such as with a convertible information handling system, and provides a variety of different power configurations, such as 45 W, 65 W, 90 W, 100 W, 130 W, 240 W and 360 W. Inclusion of a power adapter packaged for external use and having variable amounts of power output supports recycling of power adapters used for information handling systems at end of life of the information handling systems since power adapters tend to have an extended useful life. The different power configurations are supported with communication by the power adapter of its output, such as with Type C USB standard power configurations or barrel connector PSID communications commonly used by portable information handling systems when interfacing with external power adapters. In the example embodiment, a processing resource on scalar board 76, such as the scalar or a dedicated MCU or USB hub, manages distribution of the regulated power supply from the power adapter to the timing controller, backlight and other display assembly power components. A UPS 106 interfaces with scalar board 76 to initiate power from a battery in the event power is cut off from the power adapter.

In one alternative embodiment, multiple power sources are available to provide power to the display assembly and also support power distribution to external devices, such as an information handling system or peripherals that couple to a Type C USB power port connector of scalar board 76. For example, a display assembly can include AC-to-DC power adapter 170 as shown, a power board that has an AC-to-DC power adapter as described above and/or an external DC supply communicated through a Type C USB and/or barrel plug connector to the scalar board. When multiple DC power sources are available, a processing resource of the display assembly, such as the scalar and/or an MCU on the scalar board and/or power board, detects the DC power sources, identifies the capabilities of the DC power sources and arbitrates use of available power to achieve desired goals, such as efficiency and power supply to external devices. In one embodiment, logic stored in non-transitory memory of the scalar arbitrates between two or more AC-to-DC adapter power sources based upon the presence of the power sources and the efficiency of the power sources. For instance, the power source that is most efficient for a given display power use is selected as the power source to provide power to the scalar board. The efficiency of the power adapters may be tracked with empirical data stored in the non-transitory memory to aid in selection of the power source that is most efficient for a given power configuration. The power configuration may change based upon the interface of external devices to the peripheral display that draw power from the peripheral display, such as an information handling system interfaced through a Type C USB cable. As an example, a typical 27 inch peripheral display draws a maximum of 130 W and supplies 65 W to 100 W out a Type C cable connector. Logic executing on the scalar or an MCU of the power board reads the amount of power available from each DC power source and selects one or more of the DC power sources based upon power draw, to ensure that enough power is available for the detected configuration, and efficiency, to ensure that of the available DC power sources for the detected power draw, the most efficient power source is used. If the power draw exceeds the power available from any one DC power source, then multiple DC power sources may be used, such as by assigning one DC power source to power display components and another DC power source to power external devices.

Figure 18:
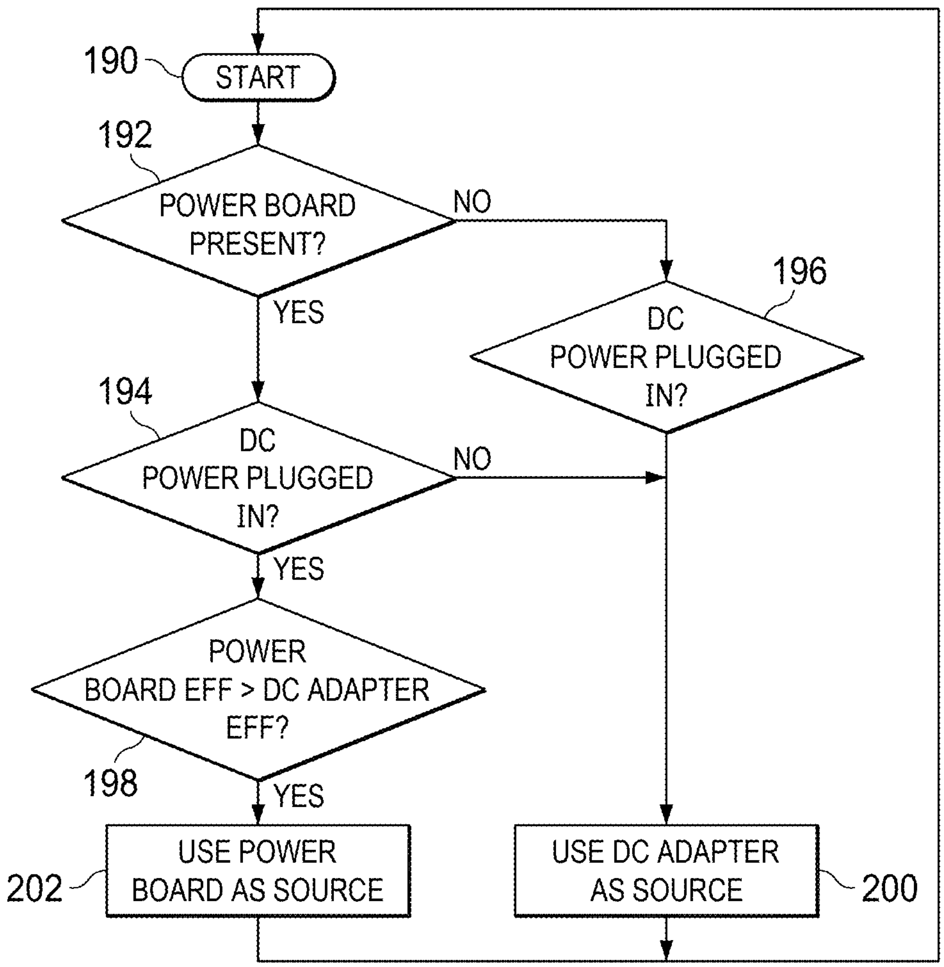
FIG. 18 depicts a flow diagram of a process for dynamic power arbitration between an internal power board and an AC-to-DC power adapter.

Referring now to FIG. 18, a flow diagram depicts a process for dynamic power arbitration between an internal power board and an AC-to-DC power adapter. The process starts at step 190 and at step 192 determines if a power board is present in the display. If a power board is not present, the process continues to step 196 to determine if a DC power source is plugged into the peripheral display. If the DC power source is plugged in, the process continues to step 200 to use the DC power source to power the display as the only detected power source. If at step 192 a power board is present, the process continues to step 194 to determine if DC power is plugged in and available from the AC-to-DC power adapter in addition to the power board. If the power adapter is not plugged in, the process continues to step 200 to use the power board adapter as the DC power source. If at step 194 both the power board and the AC-to-DC power adapter are available, the process continues to step 198 to determine which power source has the best efficiency, such as based upon an identifier retrieved from the AC-to-DC power adapter. At step 202 the power board is used as the most efficient power source, although in various embodiments with different configurations, the AC-to-DC power adapter may be selected as the more efficient power source. The process returns to step 190 when a change is detected in the available power sources or power draws to select the best power source alternative.

Figure 19:
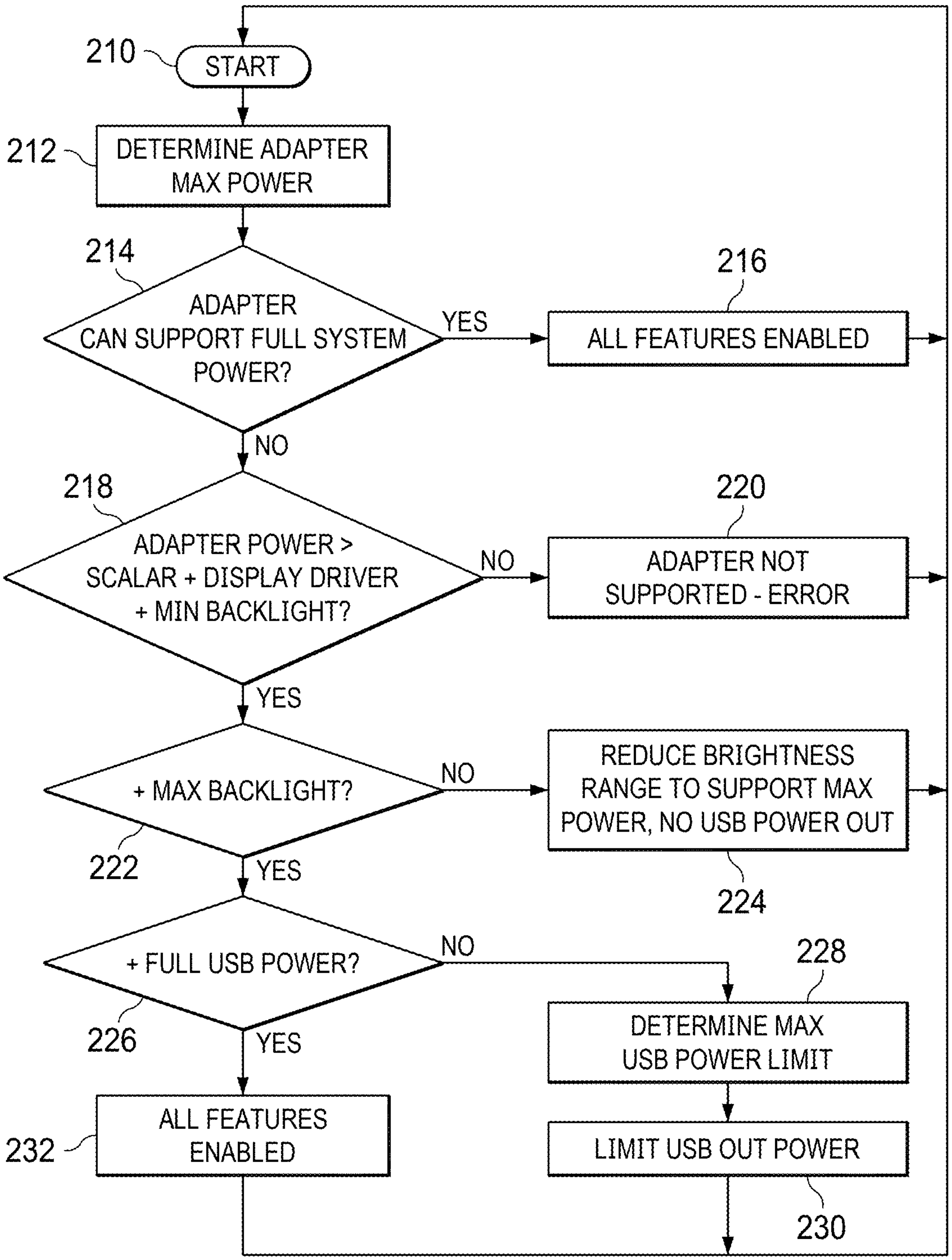
FIG. 19 depicts a flow diagram of dynamic power allocation based upon an identified connected AC-to-DC power adapter.

Referring now to FIG. 19, a flow diagram depicts dynamic power allocation based upon an identified connected AC-to-DC power adapter. The process starts at step 210 and at step 212 determines the power adapter's maximum power output, such as by reading a PSID value or a USB Type C standard power value. At step 214, a comparison of the available power from the power source and the power draw of the display is performed to determine if the power source can support full display power draw. If yes, the process continues to step 216 to enable all display features and returns to step 210 to reevaluate the power conditions if available power of power draw change, such as by interfacing additional power adapters or external devices that draw power. If at step 214 the power source cannot support full display power draw, the process continues to step 218 to determine if the power source available power meets at least the power draw needs of the scalar, timing controller and minimum backlight brightness. If the minimum power draw is not supported, the process continues to step 220 to issue an adapter error and returns to step 210. If the minimum power draw is available at step 218, the process continues to step 222 to determine if the full backlight brightness is supported by the power source. If not the process continues to step 224 to reduce the backlight brightness range to operate with the available power and the process returns to step 210. If the full backlight brightness is available at step 222, the process continues to step 226 to determine if a full amount of USB power out is supported out by the power source. If not, the process continues to step 228 to determine the maximum USB power limit and at step 230 advertises that limit to external devices that interface with the peripheral display USB power connectors. In one alternative embodiment, if the detected USB devices request power draw of less than the full amount, extra power available may be reserved for other uses, such as to increase backlight brightness. If at step 226 the full USB power out is available, the process continues to step 232 to enable all features and then returns to step 210 to monitor for changes in the amount of available power or the amount of power drawn by external devices.

Figure 20:
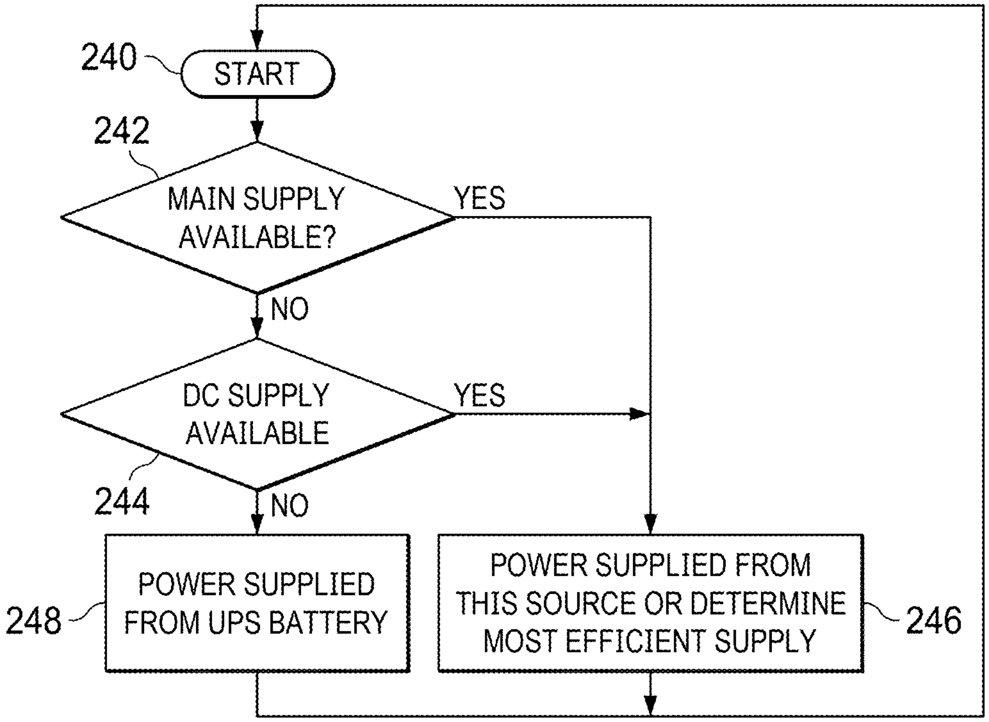
FIG. 20 depicts a flow diagram of a process for maintaining an uninterrupted power supply at a peripheral display.

Referring now to FIG. 20, a flow diagram depicts a process for maintaining an uninterrupted power supply at a peripheral display. The process starts at step 240 and at step 242 determines if the main power supply is available. If so, the process continues to step 246 to power the display from the power source and determine if a most efficient power supply is available. If the main power source is not available, the process continues to step 244 to determine if a DC power supply is available, such as an external AC-to-DC power adapter. If yes, the process continues to step 246 as before. If both power sources are not available due to a power cut off or failure, the process continues to step 248 to power the display from the uninterruptible power supply. Typically the battery will provide sufficient power for a temporary operation so that a notice of the UPS use is published along with an expected power time when the failure is detected. In one alternative embodiment, the UPS may include an external battery power source that feeds into a power plug connector, such as a Type C USB connector. For example, a battery of a portable information handling system may reverse from charging through a display USB cable to discharging so that the display has power to operate. Logic on the scalar may also revert the display to a low power consumption mode by setting a reduced brightness and scan rate when the power cut off is detected.

Figure 21A:
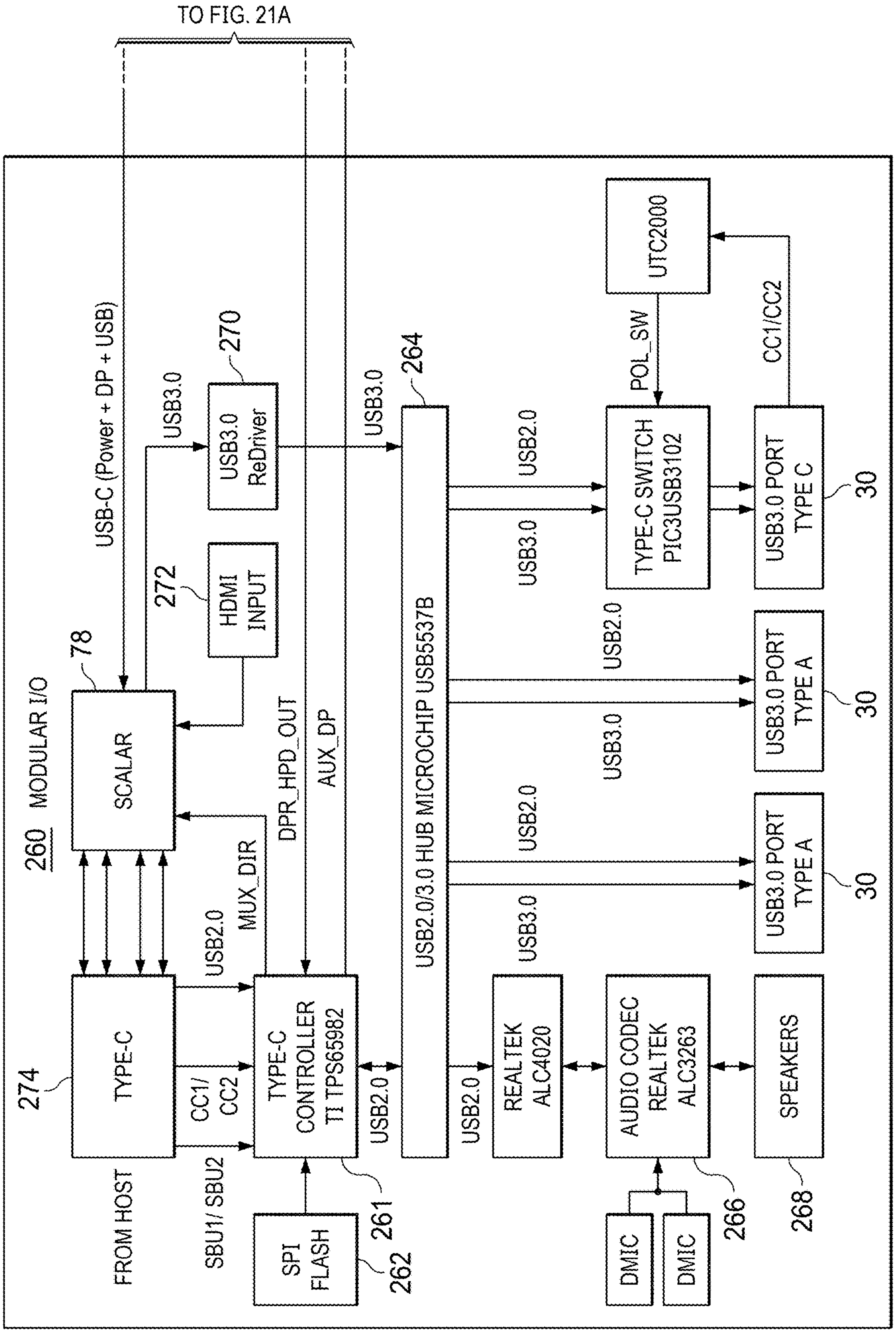
FIGS. 21A and 21B depict a block diagram of an alternative embodiment of a peripheral display having an external scalar in a modular input/output board.
Figure 21B:
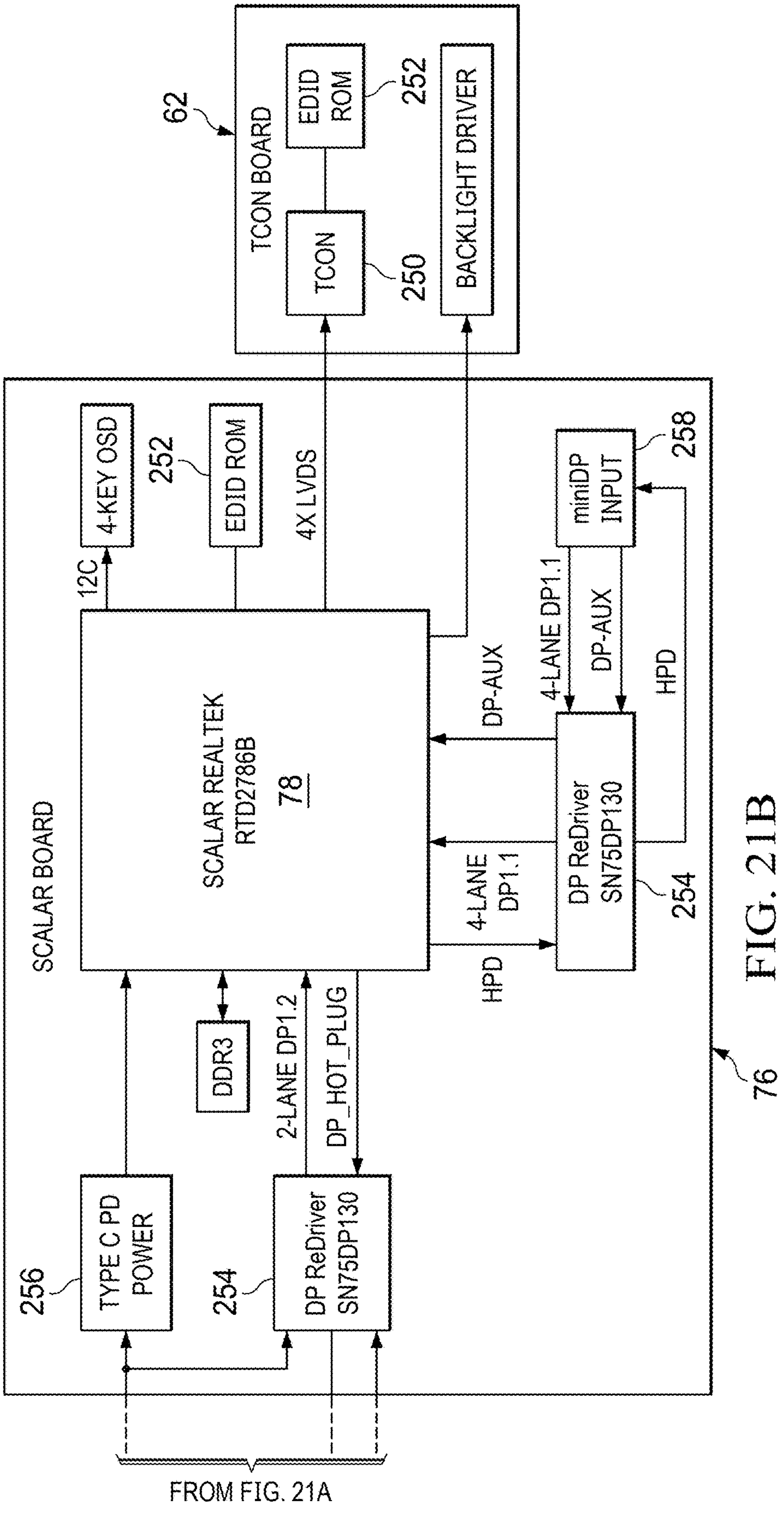

Referring now to FIGS. 21A and 21B, a block diagram depicts an alternative embodiment of a peripheral display having an external scalar in a modular input/output board. In the example embodiment, scalar board 76 couples in the display assembly as described above and a modular input/output (I/O) board 260 interfaces with scalar board 76 through a connector board from exterior to the display assembly, such as in a modular housing located outside of the cavity defined by the cover and display panel back side. Scalar board 76 has a scalar 78 that processes visual information received from various visual information sources, such as DisplayPort inputs 258 that are managed by Display Port re-drivers 254. A Type C USB power driver 256 manages power accepted from and provided to an external source. Scalar 78 in the example embodiment operates based upon system component information stored in Extended Display Identification Data (EDID) non-transitory memory. Scalar 78 provides visual information for presentation at the display panel to timing controller board 62 having a timing controller 250 that scans the visual information to display panel pixels according to EDID system component information. Scalar 78 is the primary processing resource for the display and includes a DDRS non-transitory memory to store instructions executed by scalar 78.

Modular I/O board 260 supplements the operation of a display by coupling to a display cable communication port to interface with scalar board 76 so that a scalar 78 on the modular I/O board can take over the scalar functions performed by the scalar on scalar board 76 and prioritize scalar functions. The modular I/O board offers a boost to performance of a display assembly with a more powerful scalar that supports additional functionality and input/output device ports. In the example embodiment, modular I/O board 260 includes three display cable communication ports 30 that accept USB 3.0 Type A and Type C connectors. These ports interface through a USB hub 264 and with a Type C controller 261 that manages port functions with instructions stored in an SPI flash 262 of non-transitory memory. Scalar 78 interfaces with the USB hub through a USB 3.0 re-driver 270 and also interfaces with other inputs, including HDMI inputs 272 and Type C inputs 274. Scalar 78 of modular I/O board 260 communicates with scalar board 76 through a DisplayPort re-drive 254 and provides power by a USB Type C interface. This interface allows the module I/O board scalar to command operations by the scalar board 76 scalar and thereby manage presentation of visual information by timing controller 250.

In the example embodiment, one additional function supported by the modular I/O board is presentation of audible information through an audio codec 266 and speakers 268. In such an embodiment, the speaker housing not only includes speakers but hardware and logic to manage presentation of visual information that improves an end user experience for presentation of audiovisual information. The example embodiment also supports other types of functions based upon hardware capabilities included in the speaker housing. For instance, a keyboard, video, mouse (KVM) switch is supported with logic that executes on the Type C controller to direct keyboard and mouse inputs at the USB ports to a selected of plural information handling systems interfaced with Type C USB ports. Alternative embodiments might include wireless communication capabilities, television receiver capabilities or other types of network communication capabilities that supplement the operation of the display panel.

Figure 22:
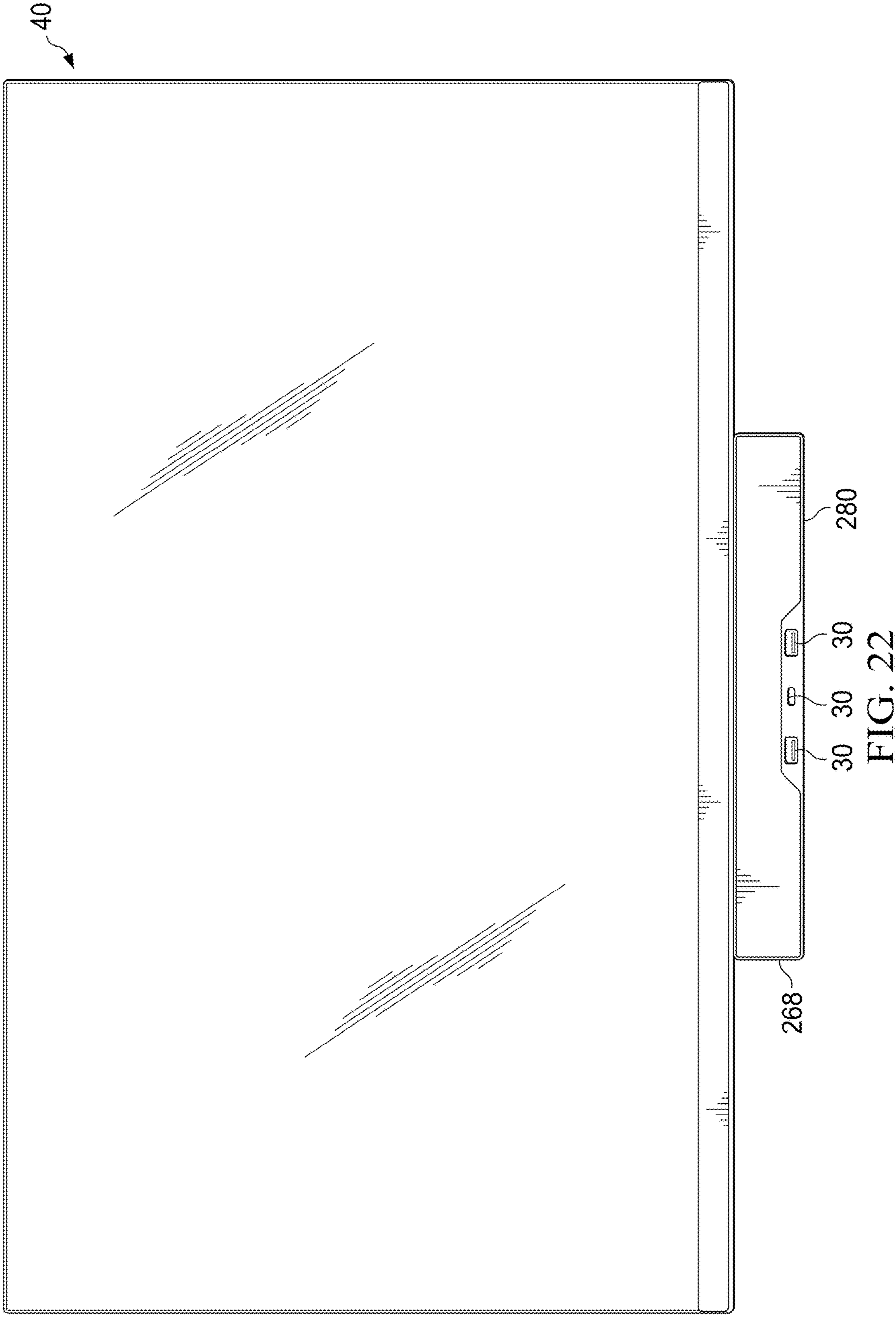
FIGS. 22, 22A and 22B depict an example embodiment of a housing to support modular I/O board functionality.
Figure 22A:
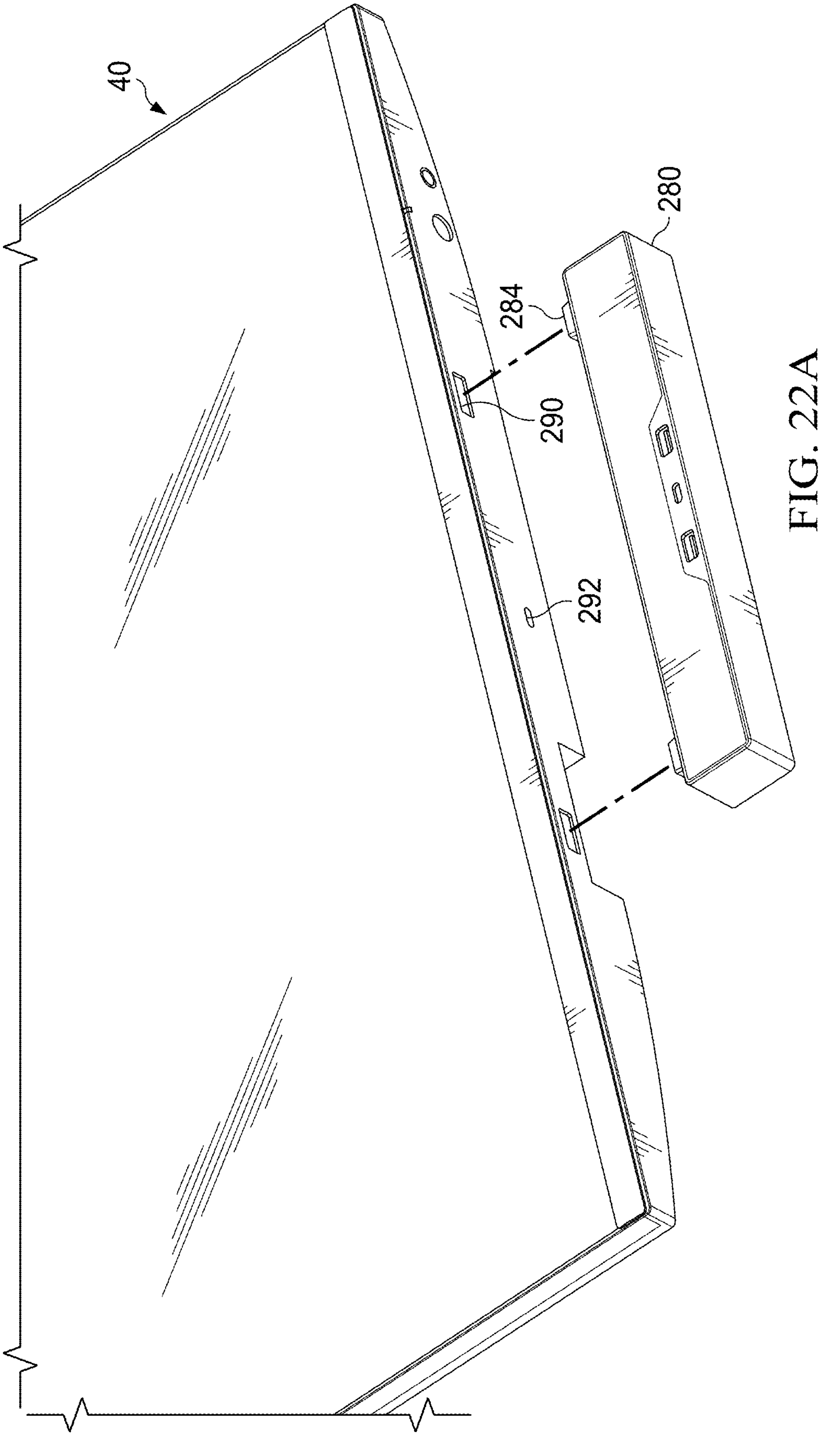
Figure 22B:
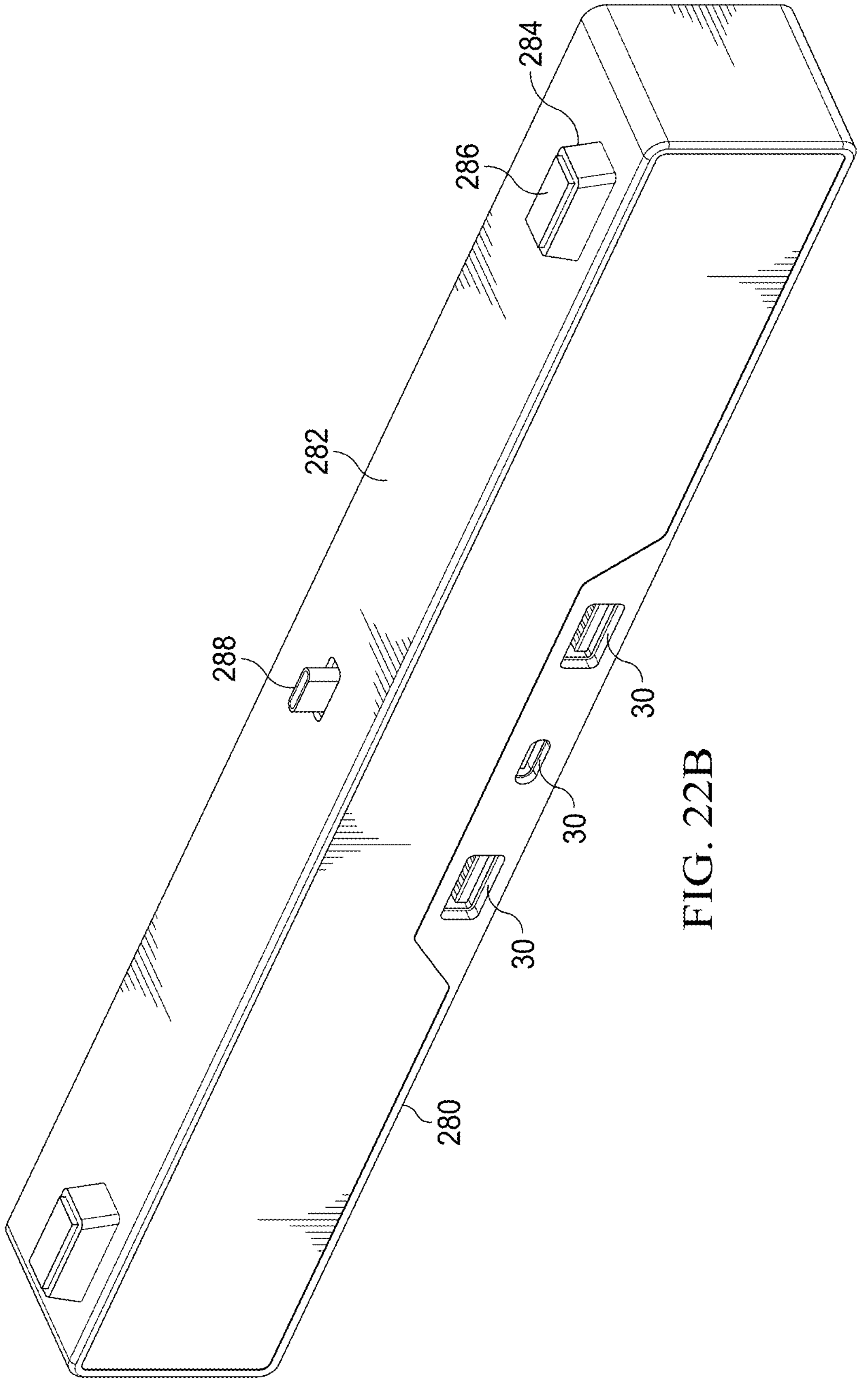

Referring now to FIGS. 22, 22A and 22B, an example embodiment of a housing to support modular I/O board functionality is depicted. FIG. 22 depicts a front view of a peripheral display 40 having a modular speaker housing 280 that includes speakers 268 and display cable communication ports 30. FIG. 22 depicts modular housing 280 aligned to couple to peripheral display 40 with magnet extensions 284 that insert in cavities 292 having a ferromagnetic frame material. A Type C USB communication port 292 at the bottom surface of peripheral display 40 interfaces with a Type C USB connector 288 extending out of the top side 282 of modular speaker housing 280 as shown in FIG. 22B. Magnets 286 are shown in magnet extensions 284 placed in close proximity to a metal frame of the peripheral display. Once the Type C USB connector inserts into the Type C USB port, the scalar in the modular I/O board receives power and interfaces with the peripheral display board to take over scalar duties and enable speaker operations as described above.

Figure 23A:
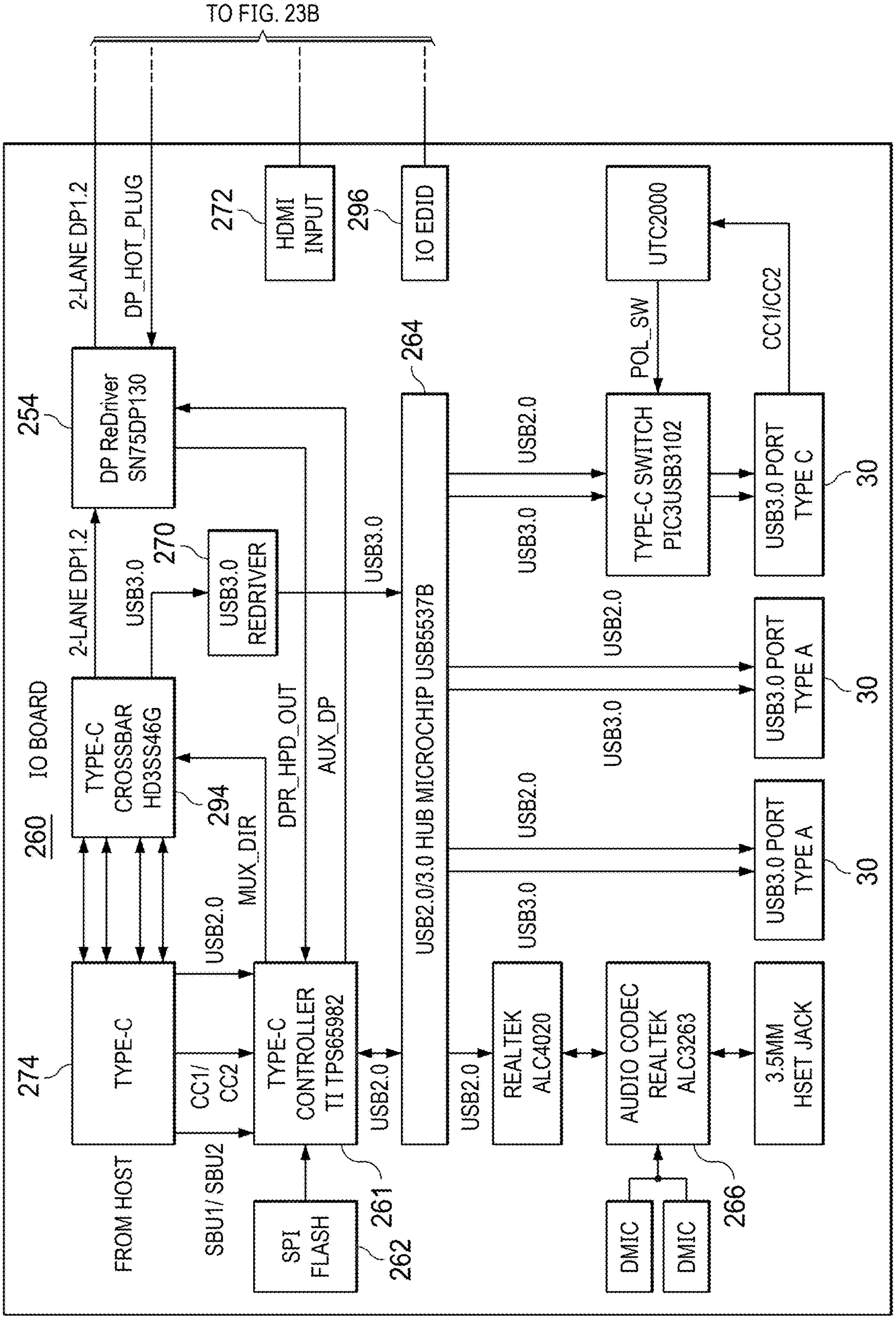
FIGS. 23A and 23B depict a block diagram of a scalar board and modular I/O board that dynamically configure display properties at a scalar with programmable EDID.
Figure 23B:
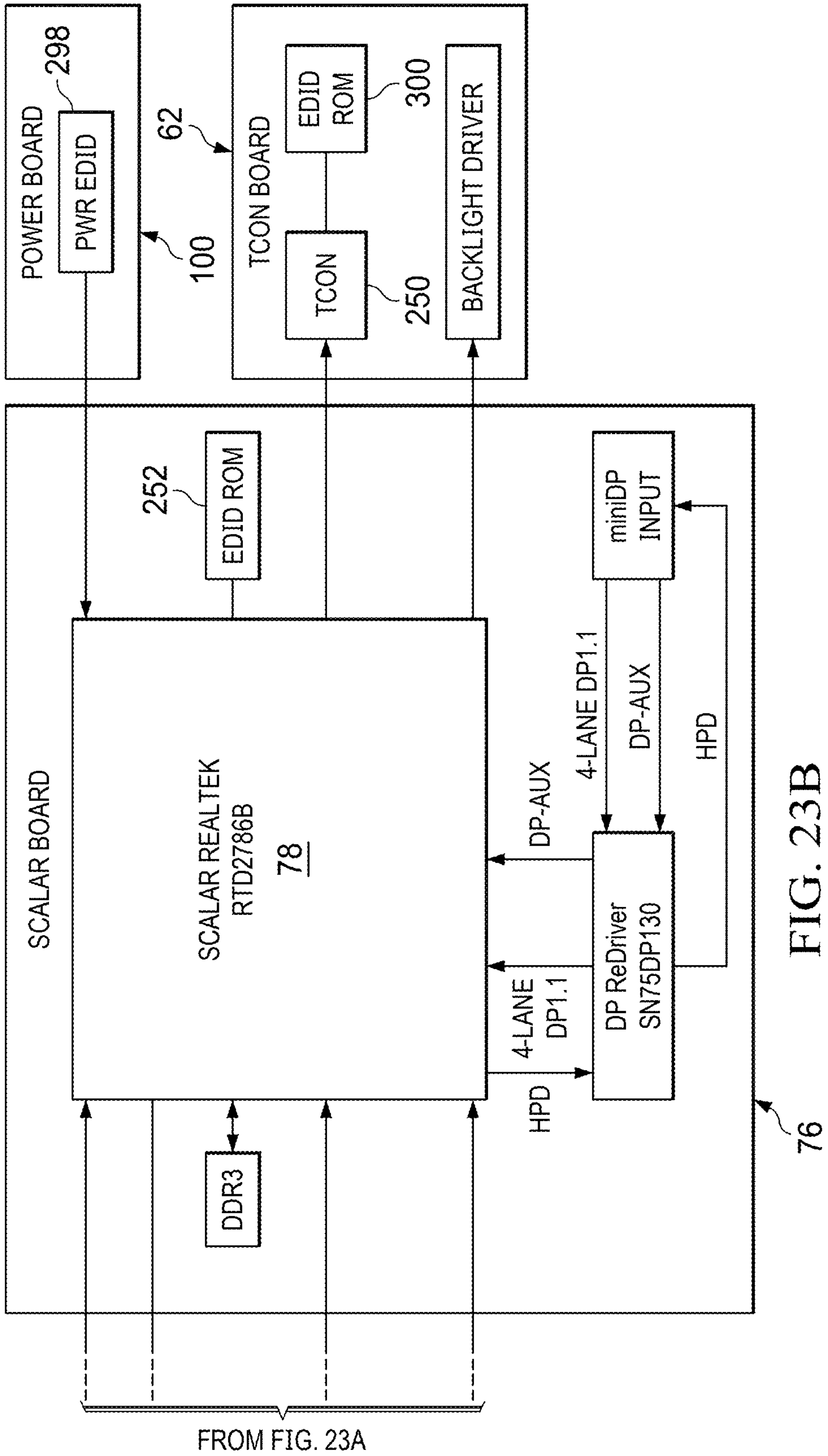

Referring now to FIGS. 23A and 23B, a block diagram of a scalar board and modular I/O board is depicted that dynamically configure display properties at a scalar with programmable EDID. In the example embodiment, modular I/O board 260 is configured to couple in the speaker of FIG. 22 to present audio information with codec 266 and support communications through display cable ports 30 with Hub 264, Type C interfaces 274, HDMI interfaces 272 and other interfaces as desired. Modular I/O board Type C controller 260 and instructions in SPI flash 262 coordinate operations through a Type C crossbar 290. Unlike the embodiment of FIG. 21, the modular I/O board 260 does not include a scalar and instead coordinates scalar operations through USB re-driver 270 and 254 with HDMI input directed to the scalar 78. In one embodiment, audio received at the modular I/O board is played directly by the codec while visual information continues to the scalar board for processing. Alternatively, the scalar board performs processing of audiovisual information and returns audio information to the audio codec for output as sounds by the speaker. The modular approach of modular I/O board 260 adds a flexibility that improves an end user experience and selectively enhances peripheral display capabilities. However, the peripheral display itself takes a modular approach with standardized interfaces so that a variety of different hardware elements may be included at assembly of the display based upon availability and selectively enhanced after assembly with modular I/O capabilities. In particular, the modular approach enhances component reuse where components that have an extended usable life can be reused in new and rebuilt peripheral displays. In order to coordinate the interaction of modular components, an I/O EDID memory 296, power EDID memory 298, timing controller EDID memory 300 and scalar EDID memory 252 adjust after peripheral display assembly to adapt to detected components, such as by storing EDID on the scalar board for detected components. In one example embodiment, scalar 78 executes instructions stored in DDR3 non-transitory memory to retrieve and track EDID information and ensure proper operation of the peripheral display. In the example embodiment, the modular I/O board communicates EDID to the scalar for application. When the modular I/O board includes a scalar, the modular I/O board leverages the scalar board to retrieve EDID and apply the EDID to control the scalar of the scalar board.

EDID settings stored in the non-transitory EDID memories are dynamically adjusted based upon the paired scalar and display module. Conventional EDID information is stored in ROM at display assembly, generally on the scalar board so that at power up the EDID information is read and applied to configure various parameters to drive the display. Parameters managed with EDID information include input type (digital/analog), color bit depth, bit format (RGB 4:4:4; YCrCb 4:4:4; etc.), video interface (HDMI, DisplayPort, DVI, etc.), screen size/resolution, and supported frame rates. Conventional peripheral displays fix these values at manufacture by hardcoding the values in ROM. The present disclosure proposes a modular component assembly in which EDID information and display operational parameters can change to support multiple display modules, scalars and power sources that are dynamically adjusted when modules are selected for assembly or to swap out during upgrading, reuse or recycling at end of life. In one example embodiment, the detection scheme splits EDID ROM into two sections, one on the scalar board that stores scalar parameters and another on the display panel that stores display module related parameters, such as on the timing controller board. On power up, the scalar detects the EDID information to populate locally and manage operation of the component. This approach can adjust to different power sources by including EDID information in the power source and to modular I/O boards by storing EDID information on the modular board. Where the modular board includes a scalar, the modular board scalar can retrieve the EDID information of other components. Where the modular board does not include a scalar, the scalar board can retrieve the EDID information from the modular board and adjust operations accordingly. As an alternative, a processing resource and non-transitory memory may be embedded in the display panel, such as at the timing controller board, to include a lookup table that determines each parameter. This can be an analog voltage level or a discrete strapping scheme for each parameter or a combination of voltage levels and a strapping scheme. The scalar board assembles the EDID information for detected modules and stores the EDID information in EDID non-transitory memory. When a component change is detected, the EDID information is updated to maintain proper peripheral display operation as the system is updated, repaired or rebuilt.

Although the present invention has been described in detail, it should be understood that various changes, substitutions and alterations can be made hereto without departing from the spirit and scope of the invention as defined by the appended claims.

What is claimed is:

1. An information handling system comprising: a housing; a processor coupled in the housing and operable to execute instructions that process information; a memory coupled in the housing and interfaced with the processor, the memory operable to store the instructions and information; and a peripheral display external the housing and interfaced with the processor to present the information as visual images at a display panel, the display panel having a back side, one or more posts extending out of the back side and a power board having one or more slots and a first power connector at a side of the power board, the power board one or more slots sliding at the one or more posts to couple the power board in a position at the back side with the first power connector aligned to directly connect the first power connector with a second power connector on a second board; and the second board comprises a scalar board having a scalar and the second power connector at a side aligned to couple directly to the first power connector; and a riser board having a first riser board connector and a joystick controller; and a second riser board connector coupled to the scalar board, first and second riser board connectors interfacing when the riser board couples to the scalar board with the joystick oriented to extend out from the back side and exposed to accept end user inputs.

2. The information handling system of claim 1 further comprising an AC-to-DC converter coupled to the back side and having a portable package with an AC cable connector to accept an AC power cable and a DC cable connector to accept a DC power cable, the DC power cable coupling to a DC cable port of the power board.

3. The information handling system of claim 2 further comprising:

a timing controller board coupled having a timing controller interfaced with pixels of the display panel and a first edge connector; and a second edge connector coupled to the scalar board and interfaced with the scalar, the first and second edge connectors aligned to directly connect with each other when the scalar board couples to the back side.

4. The information handling system of claim 3 wherein the first and second edge connectors are M.2 edge connectors.

5. The information handling system of claim 3 further comprising:

a backlight coupled to the bottom side of the display panel and configured to direct light to illuminate the display panel, the back light having a first power interface; and a second power interface coupled to the timing controller board and aligned to communicate power with the first power interface when the scalar board communicates power to the timing controller board.

6. The information handling system of claim 5 wherein the first and second power interfaces comprise spring biased contacts and opposing contact pads.

7. The information handling system of claim 5 further comprising:

a non-transitory memory coupled to the scalar board and interfaced with the scalar; and instructions stored on the non-transitory memory that when executed on the scalar cause an on screen display menu to present at the display panel under the control of the joystick.

8. A method for assembly of a peripheral display, the method comprising: extending plural posts out the back side of a display panel; forming plural slots in a power board having a power socket; sliding the plural slots at the plural posts to couple the power board to the display back side; and engaging, by the sliding, plural pins extending from a scalar board coupled to the back side into the power socket; and coupling a scalar board to the back side to align a first power connector of the power board with a second power connector of the scalar board; communicating power from the power board to the scalar board; communicating the power from the scalar board to a timing controller board; and coupling a riser to the scalar board, the riser board having a joystick exposed at the back side to accept end user inputs; and presenting an on screen display menu at the display panel in response to inputs at the joystick.

9. The method of claim 8 further comprising:

coupling a power adapter to the back side, the power adapter packaged to have an AC power cable connector and a DC power cable connector;

coupling DC power cable at a first end to the DC power cable connector and at a second end to a DC power port coupled to the power board.

10. The method of claim 9 wherein the DC power cable terminates with a USB Type C connector and the DC power port is a USB Type C port.

11. The method of claim 9 interfacing power from the scalar board to the timing controller board through M.2 edged connectors.

12. The method of claim 11 further comprising:

coupling a backlight to a bottom side of the display panel to illuminate the display panel; and communicating power to the backlight from the timing controller board through opposing pogo pins and contact pads.

13. A peripheral display comprising: a display panel having a back side; one or more posts extending out of the back side; and a power board having one or more slots and a first power connector at a side of the power board, the power board one or more slots sliding at the one or more posts to couple the power board in a position at the back side with the first power connector aligned to directly connect the first power connector with a second power connector on a second board; and the second board comprises a scalar board having a scalar and the second power connector at a side aligned to couple directly to the first power connector; and a riser board having a first riser board connector and a joystick controller; and a second riser board connector coupled to the scalar board, first and second riser board connectors interfacing when the riser board couples to the scalar board with the joystick oriented to extend out from the back side and exposed to accept end user inputs.

14. The peripheral display of claim 13 further comprising:

an AC-to-DC converter coupled to the back side and having a portable package with an AC cable connector to accept an AC power cable and a DC cable connector to accept a DC power cable;

an AC power cable coupled to the AC power connector at one end and extending out the back side at an opposite end; and a DC power cable coupled to the DC cable connector at one end and to a cable connector of the power board at the other end.

15. The peripheral display of claim 14 wherein the DC cable connector is a USB Type C connector.

* * * * *